US012572889B2

(12) United States Patent
Terrazas-Moreno et al.

(10) Patent No.:  US 12,572,889 B2
(45) Date of Patent:  Mar. 10, 2026

(54) OPTIMIZATION OF LARGE-SCALE INDUSTRIAL VALUE CHAINS

(71) Applicant: AspenTech Corporation, Bedford, MA (US)

(72) Inventors: Sebastian Terrazas-Moreno, Houston, TX (US); Dimitrios Varvarezos, Houston, TX (US)

(73) Assignee: AspenTech Corporation, Bedford, MA (US)

( * ) Notice: Subject to any disclaimer, the term of this patent is extended or adjusted under 35 U.S.C. 154(b) by 200 days.

(21) Appl. No.: 17/661,323

(22) Filed: Apr. 29, 2022

(65) Prior Publication Data

US 2022/0366360 A1     Nov. 17, 2022

Related U.S. Application Data

(60) Provisional application No. 63/182,124, filed on Apr. 30, 2021.

(51) Int. Cl.
| | |
|---|---|
| *G06Q 10/087* | (2023.01) |
| *G06Q 10/04* | (2023.01) |
| *G06Q 10/067* | (2023.01) |

(52) U.S. Cl.
CPC ........... *G06Q 10/087* (2013.01); *G06Q 10/04* (2013.01); *G06Q 10/067* (2013.01)

(58) Field of Classification Search
None
See application file for complete search history.

(56) References Cited

U.S. PATENT DOCUMENTS

| | | | |
|---|---|---|---|
| 7,206,751 B2 | 4/2007 | Hack et al. | |
| 2010/0131250 A1* | 5/2010 | Carpency | G06Q 10/06 |
| | | | 703/2 |

(Continued)

FOREIGN PATENT DOCUMENTS

| | | | | |
|---|---|---|---|---|
| WO | WO-2004038535 A2 * | 5/2004 | | G06Q 50/04 |

OTHER PUBLICATIONS

Fani Boukouvala, Data-Driven Modeling and Global Optimization of Industrial-Scale Petrochemical Planning Operations, Jul. 6-8, 2016, 2016 American Control Conference (ACC) (Year: 2016).*

(Continued)

*Primary Examiner* — Jerry O'Connor
*Assistant Examiner* — Matthew H Divelbiss
(74) *Attorney, Agent, or Firm* — Hamilton, Brook, Smith & Reynolds, P.C.

(57)     ABSTRACT

Embodiments control industrial supply chains. An embodiment controls a supply chain formed of multiple nodes by obtaining an input-output model for each node. In response, for each node in the supply chain an equation-oriented model is generated using the obtained input-output model corresponding to the node. The generated equation-oriented models of the multiple nodes are integrated with a linking structure to form an optimization model of the supply chain. The optimization model of the supply chain includes a plurality of variables, e.g., interface variables indicating relationships between the generated equation-oriented models for each node in the supply chain. To continue, the optimization model of the supply chain is solved using a categorization of each of the plurality of variables to determine a value for at least one variable of the plurality. In turn, the method outputs a signal indicating the determined value.

16 Claims, 10 Drawing Sheets

(56) References Cited

U.S. PATENT DOCUMENTS

| | | | |
|---|---|---|---|
| 2013/0018517 A1* | 1/2013 | Kalagnanam | H02J 3/00 |
| | | | 700/291 |
| 2014/0128996 A1* | 5/2014 | Sayyarrodsari | G05B 19/41885 |
| | | | 700/29 |
| 2014/0303792 A1* | 10/2014 | Tsuzaki | G06Q 50/06 |
| | | | 700/281 |
| 2021/0248496 A1* | 8/2021 | Verhoeven | G06N 5/04 |

OTHER PUBLICATIONS

Rahmaniani, R., et al., "The Benders decomposition algorithm: A literature review", European Journal of Operational Research 259 801-817 (2017).

Dong, J., et al. IBM Research Report, "IBM SmartSCOR—A SCOR Based Supply Chain Transformation Platform through Simulation and Optimization Techniques", Jun. 26, 2006.

Nasab, N. Moradi, et al., "A Benders' Decomposition Method to Solve a Multi-period, Multi-echelon, and Multi-product Integrated Petroleum Supply Chain", Process Integration and Optimization for Sustainability Aug. 21, 2017.

Neiro, Sergio, M.S., et al. "A general modeling framework for the operational planning of petroleum supply chains", Science Direct, Computer and Chemical Engineering 28:781-896 (2004).

* cited by examiner

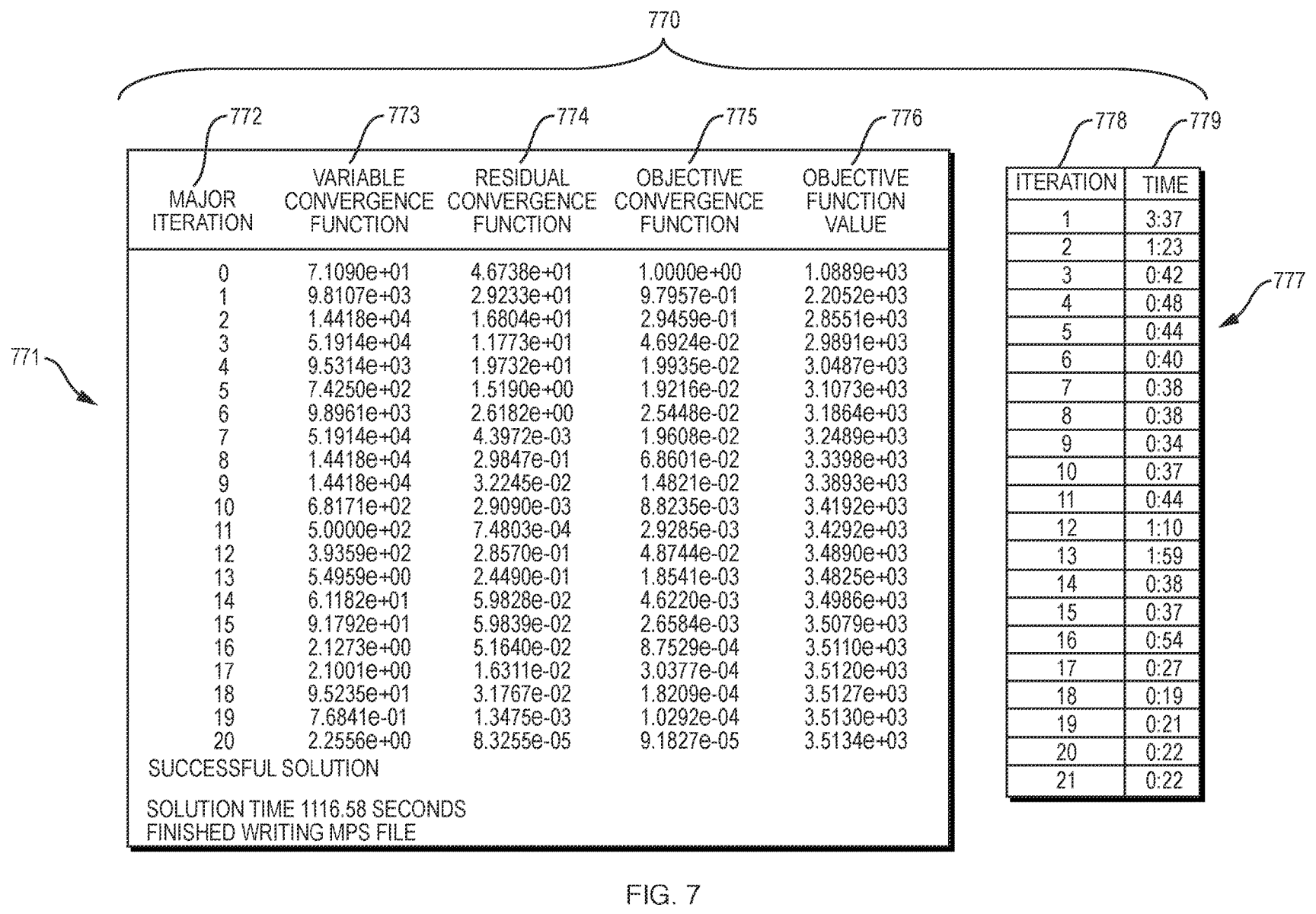

| MAJOR ITERATION | VARIABLE CONVERGENCE FUNCTION | RESIDUAL CONVERGENCE FUNCTION | OBJECTIVE CONVERGENCE FUNCTION | OBJECTIVE FUNCTION VALUE |
|---|---|---|---|---|
| 0 | 7.1090e+01 | 4.6738e+01 | 1.0000e+00 | 1.0889e+03 |
| 1 | 9.8107e+03 | 2.9233e+01 | 9.7957e-01 | 2.2052e+03 |
| 2 | 1.4418e+04 | 1.6804e+01 | 2.9459e-01 | 2.8551e+03 |
| 3 | 5.1914e+04 | 1.1773e+01 | 4.6924e-02 | 2.9891e+03 |
| 4 | 9.5314e+03 | 1.9732e+01 | 1.9935e-02 | 3.0487e+03 |
| 5 | 7.4250e+02 | 1.5190e+00 | 1.9216e-02 | 3.1073e+03 |
| 6 | 9.8961e+03 | 2.6182e+00 | 2.5448e-02 | 3.1864e+03 |
| 7 | 5.1914e+04 | 4.3972e-03 | 1.9608e-02 | 3.2489e+03 |
| 8 | 1.4418e+04 | 2.9847e-01 | 6.8601e-02 | 3.3398e+03 |
| 9 | 1.4418e+04 | 3.2245e-02 | 1.4821e-02 | 3.3893e+03 |
| 10 | 6.8171e+02 | 2.9090e-03 | 8.8235e-03 | 3.4192e+03 |
| 11 | 5.0000e+02 | 7.4803e-04 | 2.9285e-03 | 3.4292e+03 |
| 12 | 3.9359e+02 | 2.8570e-01 | 4.8744e-02 | 3.4890e+03 |
| 13 | 5.4959e+00 | 2.4490e-01 | 1.8541e-03 | 3.4825e+03 |
| 14 | 6.1182e+01 | 5.9828e-02 | 4.6220e-03 | 3.4986e+03 |
| 15 | 9.1792e+01 | 5.9839e-02 | 2.6584e-03 | 3.5079e+03 |
| 16 | 2.1273e+00 | 5.1640e-02 | 8.7529e-04 | 3.5110e+03 |
| 17 | 2.1001e+00 | 1.6311e-02 | 3.0377e-04 | 3.5120e+03 |
| 18 | 9.5235e+01 | 3.1767e-02 | 1.8209e-04 | 3.5127e+03 |
| 19 | 7.6841e-01 | 1.3475e-03 | 1.0292e-04 | 3.5130e+03 |
| 20 | 2.2556e+00 | 8.3255e-05 | 9.1827e-05 | 3.5134e+03 |

SUCCESSFUL SOLUTION

SOLUTION TIME 1116.58 SECONDS
FINISHED WRITING MPS FILE

| ITERATION | TIME |
|---|---|
| 1 | 3:37 |
| 2 | 1:23 |
| 3 | 0:42 |
| 4 | 0:48 |
| 5 | 0:44 |
| 6 | 0:40 |
| 7 | 0:38 |
| 8 | 0:38 |
| 9 | 0:34 |
| 10 | 0:37 |
| 11 | 0:44 |
| 12 | 1:10 |
| 13 | 1:59 |
| 14 | 0:38 |
| 15 | 0:37 |
| 16 | 0:54 |
| 17 | 0:27 |
| 18 | 0:19 |
| 19 | 0:21 |
| 20 | 0:22 |
| 21 | 0:22 |

FIG. 7

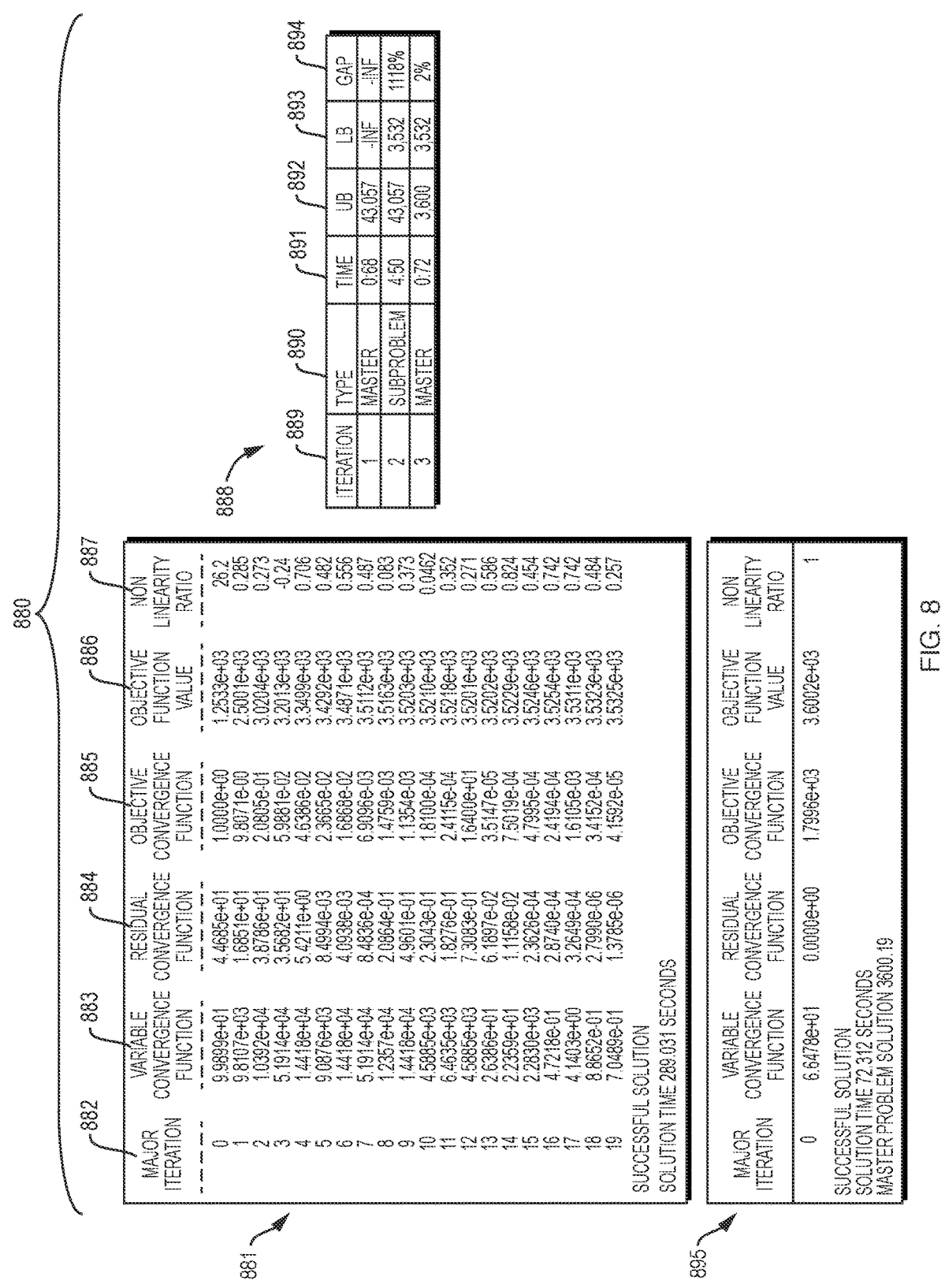

| ITERATION | TYPE | TIME | UB | LB | GAP |
|---|---|---|---|---|---|
| 1 | MASTER | 0.68 | 43.057 | -INF | -INF |
| 2 | SUBPROBLEM | 4.50 | 43.057 | 3.532 | 1118% |
| 3 | MASTER | 0.72 | 3.600 | 3.532 | 2% |

| MAJOR ITERATION | VARIABLE CONVERGENCE FUNCTION | RESIDUAL CONVERGENCE FUNCTION | OBJECTIVE CONVERGENCE FUNCTION | OBJECTIVE FUNCTION VALUE | NON LINEARITY RATIO |
|---|---|---|---|---|---|
| 0 | 9.9899e+01 | 4.4685e-01 | 1.0000e+00 | 1.2533e+03 | 26.2 |
| 1 | 9.8107e+03 | 1.6651e+01 | 9.8071e-00 | 2.5001e+03 | 0.285 |
| 2 | 1.0392e+04 | 3.8786e-01 | 2.0805e-01 | 3.0204e+03 | 0.273 |
| 3 | 5.1914e+04 | 3.5692e-01 | 5.9881e-02 | 3.2013e+03 | -0.24 |
| 4 | 1.4418e+04 | 5.4211e-00 | 4.6386e-02 | 3.3499e+03 | 0.706 |
| 5 | 9.0876e+03 | 8.4994e-03 | 2.3665e-02 | 3.4292e+03 | 0.482 |
| 6 | 1.4418e+04 | 4.0938e-03 | 1.6868e-02 | 3.4871e+03 | 0.556 |
| 7 | 5.1914e+04 | 8.4836e-04 | 6.9096e-03 | 3.5112e+03 | 0.487 |
| 8 | 1.2357e+04 | 2.0604e-01 | 1.4759e-03 | 3.5163e+03 | 0.083 |
| 9 | 1.4418e+04 | 4.9601e-01 | 1.1354e-03 | 3.5203e+03 | 0.373 |
| 10 | 4.5885e+03 | 2.3043e-01 | 1.8100e-04 | 3.5210e+03 | 0.0462 |
| 11 | 6.4635e+03 | 1.8276e-01 | 2.4115e-04 | 3.5218e+03 | 0.352 |
| 12 | 4.5885e+03 | 7.3083e-01 | 1.6400e+01 | 3.5201e+03 | 0.271 |
| 13 | 2.6386e+01 | 6.1897e-02 | 3.5147e-05 | 3.5202e+03 | 0.586 |
| 14 | 2.2359e+01 | 1.1158e-02 | 7.5019e-04 | 3.5229e+03 | 0.824 |
| 15 | 2.2830e+03 | 2.3626e-04 | 4.7985e-04 | 3.5246e+03 | 0.454 |
| 16 | 4.7216e-01 | 2.8740e-04 | 2.4194e-04 | 3.5254e+03 | 0.742 |
| 17 | 4.1403e+00 | 3.2649e-04 | 1.6105e-03 | 3.5311e+03 | 0.742 |
| 18 | 8.8652e-01 | 2.7990e-06 | 3.4152e-04 | 3.5323e+03 | 0.484 |
| 19 | 7.0488e-01 | 1.3785e-06 | 4.1592e-05 | 3.5325e+03 | 0.257 |

SUCCESSFUL SOLUTION
SOLUTION TIME 289.031 SECONDS

| MAJOR ITERATION | VARIABLE CONVERGENCE FUNCTION | RESIDUAL CONVERGENCE FUNCTION | OBJECTIVE CONVERGENCE FUNCTION | OBJECTIVE FUNCTION VALUE | NON LINEARITY RATIO |
|---|---|---|---|---|---|
| 0 | 6.6478e+01 | 0.0000e+00 | 1.7996e+03 | 3.6002e+03 | 1 |

SUCCESSFUL SOLUTION
SOLUTION TIME 72.312 SECONDS
MASTER PROBLEM SOLUTION 3600.19

FIG. 8

OPTIMIZATION OF LARGE-SCALE INDUSTRIAL VALUE CHAINS

RELATED APPLICATION

This application claims the benefit of U.S. Provisional Application No. 63/182,124, filed on Apr. 30, 2021. The entire teachings of the above application are incorporated herein by reference.

BACKGROUND

There is a trend in the petroleum and chemicals industries toward more supply chain integration and optimization. It is expected that oil refineries will be more tightly integrated with base petrochemical plants, chemical derivatives plants, and downstream polymer producing facilities.

SUMMARY

The trend toward supply chain integration and value chain optimization is creating a need for integrated software solutions that support integrated decision-making. Currently, nodes, e.g., separate locations in a supply chain, in the downstream petroleum and chemical supply chain are operated mostly independently from each other within local decision envelopes. The interfaces between nodes, such as material and energy streams exchanged between oil refinery and related downstream chemical plants, are managed in sub-optimal ways using heuristic and myopic business rules.

Embodiments solve these problems and provide improved functionality for controlling supply chains and the nodes therein. It is noted that while example embodiments are described herein in relation to petroleum and chemicals industries, embodiments are not so limited and may be used to control any supply chains.

An example embodiment is directed to a method for controlling an industrial supply chain. The method obtains an input-output model for each node in a supply chain, formed of multiple nodes. In response, an equation-oriented model is generated for each node in the supply chain using the obtained input-output model corresponding to the node. To continue, such an embodiment integrates the generated equation-oriented models of the multiple nodes with a linking structure to form an optimization model of the supply chain. The optimization model of the supply chain includes a plurality of variables, e.g., interface variables indicating relationships between the generated equation-oriented models for each node in the supply chain. To continue, the optimization model of the supply chain is solved using a categorization of each of the plurality of variables to determine a value for at least one variable of the plurality. The method outputs a signal indicating the determined value. According to an embodiment, this outputting enables controlling a given node of the multiple nodes in the supply chain in accordance with the determined value.

According to another embodiment, each obtained input-output model includes one or more inputs and one or more outputs. In such an embodiment the one or more inputs are configured to be manipulated to optimize the one or more outputs with respect to an objective function or performance indicator. Example objective functions include maximizing profit, maximizing revenue, minimizing cost, maximizing resiliency, minimizing risk, and maximizing customer satisfaction, amongst others.

Embodiments can implement one or more functionalities to generate equation-oriented models. An embodiment generates an equation oriented model by performing at least one of: (i) processing a given input-output model to generate a matrix indicating logistic, economic, and operational constraints for a supply chain node corresponding to the given input-output model, (ii) using a given input-output model and fitting parameters to a first-principles engineering model, and (iii) processing a given input-output model using at least one of statistics, machine learning, and artificial intelligence.

In an embodiment, the linking structure includes at least one of: mathematical variables and equations connecting the generated equation-oriented models. As part of solving the optimization model, an embodiment assigns each of the plurality variables to one of a plurality of categories. Example categories, according to an embodiment, include: (i) variables connecting nodes in the supply chain, (ii) variables in an objective function, (iii) variables in linear constraints in the optimization model, and (iv) variables exclusively in nonlinear constraints.

Another embodiment solves the optimization model by grouping linear constraints in the optimization model and grouping nonlinear constraints in the optimization model. Such an embodiment then removes the grouped nonlinear constraints from the optimization model. The nonlinear constraints are removed by: (i) for each nonlinear constraint, creating a corresponding linear constraint by substituting each variable categorized as exclusively in the nonlinear constraint, with a lower and upper bound of the variable and (ii) replacing each nonlinear constraint in the optimization model with the created corresponding linear constraint. In turn, the optimization model with the removed nonlinear constraints is solved to determine optimal values for variables categorized as connecting supply chain nodes or variables that appear in an objective function. These determined optimal values are passed back to given equation-oriented models that contain the nonlinear constraints and the given equation oriented models are solved. If an equation-oriented model is feasible the solving converges and if an equation oriented model is infeasible, the solving does not converge. In response to an equation-oriented model not converging, an embodiment creates a cut constraint in terms of variables categorized as at least one of: connecting supply chain nodes and appearing in an objective function, and adds the cut constraint to the optimization model. This procedure is repeated, i.e., iterated until solving each equation-oriented model converges.

Yet another embodiment obtains the outputted signal and determines a control parameter of the given node using the determined value, from the obtained signal, in a given equation-oriented model indicating behavior of the given node. Such a method operates the given node in accordance with the determined control parameter.

Nodes may include any supply chain elements known to those of skill in the art. For example, in an embodiment the nodes in the supply chain include: a refinery node, a petrochemical plant, i.e., cracker, node, and a polymer plant node.

Another embodiment is directed to a computer system for controlling a supply chain. The computer system includes a processor and a memory with computer code instructions stored thereon. In such an embodiment, the processor and the memory, with the computer code instructions, are configured to cause the system to control a supply chain in accordance with any embodiment or combination of embodiments described herein.

Yet another embodiment is directed to a computer program product for controlling a supply chain. The computer program product comprises one or more non-transitory computer-readable storage devices and program instructions stored on at least one of the one or more storage devices. The program instructions, when loaded and executed by a processor, cause an apparatus associated with the processor to control a supply chain as described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 7 are tables of results of operational conditions of the system illustrated in FIG. 6, determined using existing methods.

FIG. 8 are tables of results of operational conditions of the system illustrated in FIG. 6, determined using embodiments.

DETAILED DESCRIPTION

A description of example embodiments follows.

Embodiments provide improved functionality for controlling supply chains and enable integrated-decision making across the supply chain so as to maximize overall value-creation. Embodiments include a framework, including an application architecture, algorithms, and tools, for optimizing value creation across the entire supply chain. In the long term, embodiments of the present invention enable the smooth transition from using crude oil feedstocks for fuel production to producing other valuable chemicals and ultimately replacing crude oil with economical and sustainable bio-based feedstocks.

Example Method

Figure 1:
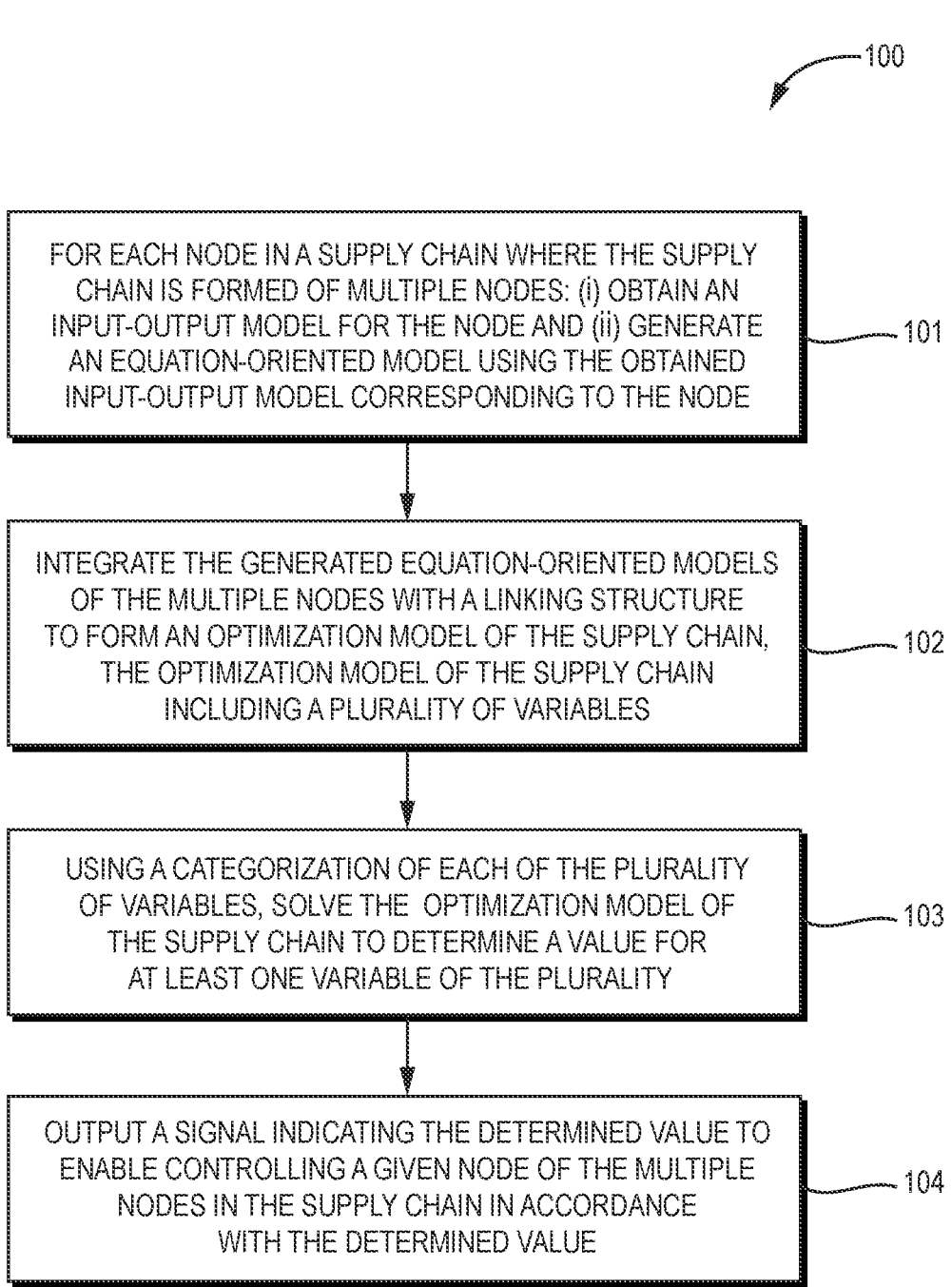
FIG. 1 is a flowchart of a method of controlling a supply chain according to an embodiment.

FIG. 1 is a flowchart of an example method 100 for controlling a supply chain according to an embodiment. In an embodiment, the supply chain is formed of multiple nodes. For instance, in an embodiment the nodes in the supply chain include: a refinery node, a petrochemical plant node, and a polymer plant node. Moreover, it is noted that embodiments are not limited to the foregoing nodes, and nodes may include any supply chain elements known to those of skill in the art. In one such embodiment, each node represents a distinct physical location.

The method 100 is computer implemented. As such, the method 100 can be implemented using any computing device or combination of computing devices known in the art. Moreover, embodiments of the method 100 can be implemented in a control tower of a supply chain to monitor and control elements of the supply chain.

The method 100 begins at step 101 by obtaining an input-output model for each node in a supply chain, formed of multiple nodes. The method 100 is computer implemented and, as such, input-output models may be obtained at step 101 from any point(s), e.g., storage memory, communicatively coupled to one or more computing devices implementing the method 100 or point(s) that are capable of being communicatively coupled to the one or more computing devices implementing the method 100. According to an embodiment, each input-output model obtained at step 101 includes one or more inputs and one or more outputs. An example of an input-output model obtained at step 101 is the model of a production plant where the inputs are raw materials and the outputs are the finished products. Yet another example is a set of equations corresponding to a chemical process where the inputs are the reactants, and the outputs are the products of the reaction. In such an embodiment, the one or more inputs are configured to be manipulated to optimize the one or more outputs with respect to an objective function or performance indicator. Thus, in such an embodiment, an objective function is an element of the input output model. Example objective functions include maximizing profit, maximizing revenue, minimizing cost, maximizing resiliency, minimizing risk, and maximizing customer satisfaction, amongst other examples.

Also at step 101, an equation-oriented model is generated for each node using the obtained input-output model corresponding to the node. Embodiments of the method 100 can implement one or more functionalities to generate equation-oriented models at step 101. An embodiment generates an equation oriented model by performing at least one of: (i) processing a given input-output model to generate a matrix indicating one or more of logistic, economic, and operational constraints for a supply chain node corresponding to the given input-output model (e.g., material balances, inventory constraints, capacity constraints, and supply and demand parameters in a manufacturing site), (ii) using a given input-output model and fitting parameters to a first-principles engineering model (e.g., kinetic equations, and heat and mass transfer equations in a chemical reactor), and (iii) processing a given input-output model using at least one of statistics, machine learning, and artificial intelligence (e.g., a surrogate model of a pharmaceutical production process obtained by statistical regression on historical data).

Returning to FIG. 1, at step 102 the generated equation-oriented models of the multiple nodes are integrated with a linking structure to form an optimization model of the supply chain. The optimization model of the supply chain includes a plurality of variables, e.g., interface variables indicating relationships between the generated equation-oriented models for each node in the supply chain. Further, according to an embodiment, the linking structure includes at least one of: mathematical variables and equations connecting the generated equation oriented models. To illustrate linking structures, consider an example supply chain comprising nodes representing basic petrochemical processes and other nodes representing polymerization plants. In such an illustrative example, the linking structure is made of transfer equations of monomers produced by the basic petrochemical nodes and consumed by polymerization nodes.

To continue, at step 103, the optimization model of the supply chain is solved using a categorization of each of the plurality of variables so as to determine a value for at least one variable of the plurality. As part of solving the optimization model at step 103, an embodiment assigns each of the plurality variables to one of a plurality of categories. Example categories, according to an embodiment include: (i) variables connecting nodes in the supply chain, (ii) variables in an objective function, (iii) variables in linear constraints in the optimization model, and (iv) variables exclusively in nonlinear constraints.

Another embodiment of the method 100 solves the optimization model at step 103 by grouping linear constraints in the optimization model and grouping nonlinear constraints in the optimization model. Such an embodiment then removes the grouped nonlinear constraints from the optimization model. The nonlinear constraints are removed by: (i) for each nonlinear constraint, creating a corresponding linear constraint by substituting each variable categorized as exclusively in the nonlinear constraint, with a lower and upper bound of the variable and (ii) replacing each nonlinear constraint in the optimization model with the created corresponding linear constraint. In turn, the optimization model with the removed nonlinear constraints is solved to determine optimal values for variables categorized as connecting supply chain nodes or variables that appear in an objective function that is contained in the optimization model, e.g., in an equation-oriented model of the optimization model. These determined optimal values are passed back to given equation-oriented models that contain the nonlinear constraints and the given equation oriented models are solved. If an equation-oriented model is feasible the solving converges and if an equation oriented model is infeasible, the solving does not converge. In response to an equation-oriented model not converging, an embodiment creates a cut constraint in terms of variables categorized as at least one of: connecting supply chain nodes and appearing in an objective function and adds the cut constraint to the optimization model. This procedure is repeated, i.e., iterated, until solving each equation-oriented model converges.

In turn, the method 100, at step 104 outputs a signal indicating the determined value, i.e., the value determined at step 103 for the at least one variable. According to an embodiment, this outputting enables controlling a given node of the multiple nodes in the supply chain in accordance with the determined value. In an embodiment, the outputting 104 provides the signal to a given node in the supply chain via a known communication methodology, e.g., one or more network connections. Such a node is then controlled, e.g., automatically, through one or more computing devices implementing instructions in response to the received signal. Amongst other examples, the node may be controlled to produce an amount of a product indicated by the signal.

Embodiments of the method 100 can react to disruptions in the supply chain by providing modified recommendations for operating the nodes in the supply chain given the disruptions. For example, if a disruption, e.g., zero output, occurs in a node corresponding to a basic petrochemical plant, its impact will propagate to a polymerization plant downstream of the basic petrochemical plant, via the connecting structure. An embodiment, e.g., the method 100, will identify that zero output is coming from the node corresponding to the basic petrochemical plant and the method will automatically determine that the polymerization plant should receive input from an alternative source linked to the polymerization plant in the optimized model. This input can be sent to the polymerization plant in the real-world so that the polymerization plant will obtain raw materials from the alternative source, e.g., an external market, connected to the polymerization plant in the optimization model. The polymerization plant is able to react, because the polymerization plant is represented by an input-output model that can be optimized for different values of the inputs.

Another embodiment of the method 100 obtains the outputted 104 signal and determines a control parameter of the given node by using the determined value (from the signal) in a given equation-oriented model that indicates behavior of the given node. Such a method operates the given node in accordance with the determined control parameter.

Figure 2:
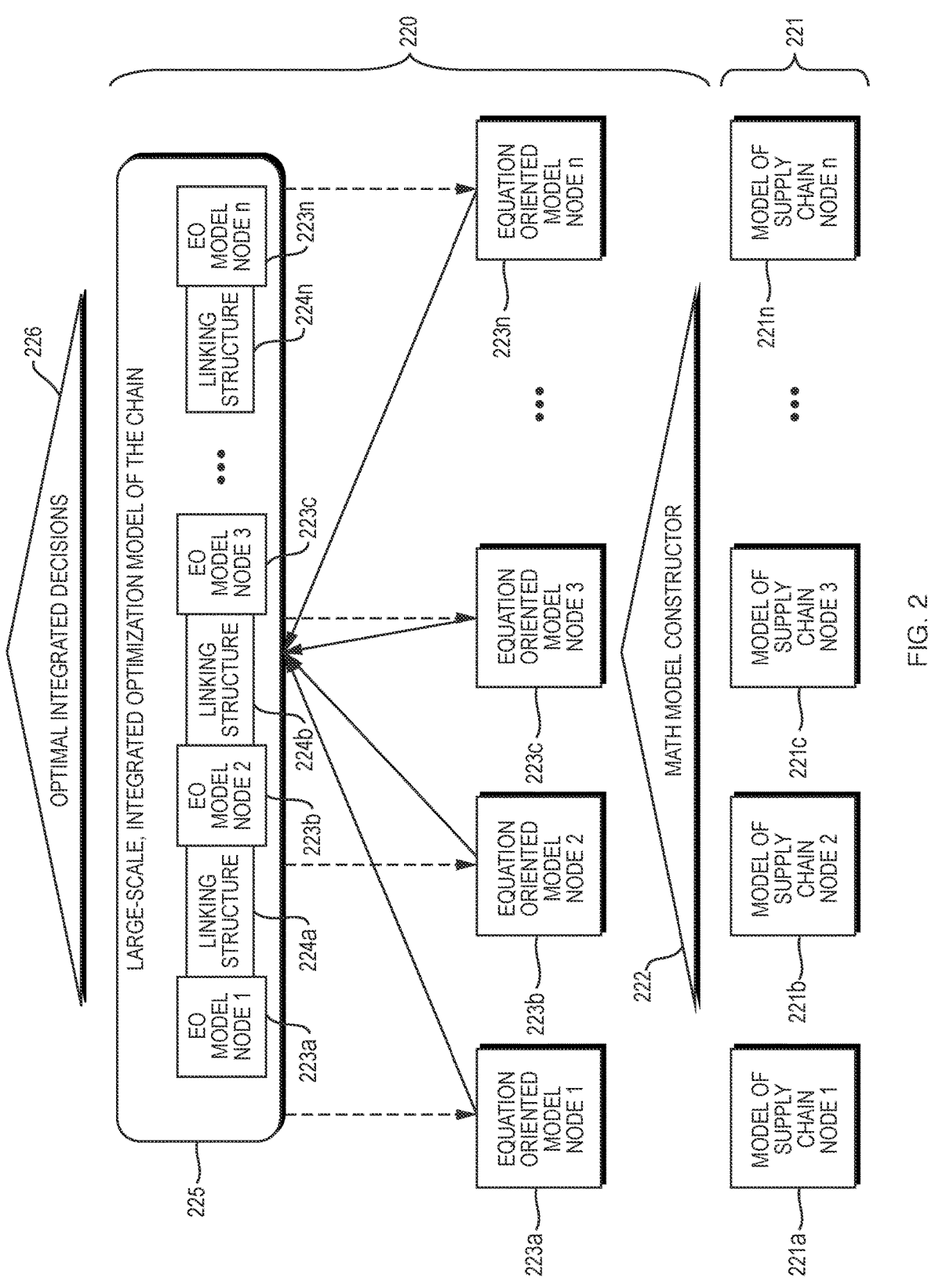
FIG. 2 is a schematic view of an embodiment of the present invention.

To illustrate the method 100, consider an example where the supply chain includes a refinery and a petrochemical plant. In such an example, at step 101 an input-output model is obtained for the refinery and an input output model is obtained for the petrochemical plant. The model for the refinery and the petrochemical can be obtained from the mixed-integer linear or nonlinear programming models typically used for production planning in such facilities, Equation oriented models are then generated for each of the refinery and petrochemical plant. At step 102, these equation-oriented models are linked by defining a constraint which requires a chemical output of the refinery to be an input quantity to the petrochemical plant. Such inputs are determined by the chemical processes in the refinery and the petrochemical plant. For instance, petrochemical plants consume Naphtha, which is a common product of refinery processes. Therefore, this material becomes an output for the refinery and an input for the petrochemical plant. This linked model is then solved to determine an optimized amount of the chemical to be produced by the refinery. Because the models of the refinery and petrochemical plant were linked and solved together, the optimized output of the refinery is an optimized quantity of input to the petrochemical plant given the constraint (output of refinery is input to the petrochemical plant). In real-world operation, the refinery is then controlled to produce the determined optimized output. Framework for Value Chain Optimization FIG. 2 depicts the main elements of a framework 220, according to an embodiment, and outlines how these elements interact. Embodiments, e.g., the framework 220 of FIG. 2, can be implemented using computing devices configured with program instructions to carry out the various functionalities described herein. Moreover, such implementations may leverage any number and variety of data structures for storing and holding the models and variables used within the framework 220.

The framework 220 utilizes input-output models 221*a-n* (generally referred to as 221) for nodes in the supply chain where the inputs for the models 221*a-n* can be manipulated to optimize the output with respect to an objective function or indicator of performance. According to an embodiment, the input-output models 221*a-n* are generic input-output models. Moreover, in an embodiment, the models 221*a-n* correspond to each node, e.g., physical location, in the supply chain.

Generation of Representation of Each Model in the Supply Chain

The framework 220 includes a math model constructor element 222. The math model constructor 220 is configured to programmatically create an equation-oriented representation 223*a-n* of each node model 221*a-n*. In embodiments, the math model constructor 222 can have different implementations. For instance, the math model constructor 222 can implement a mathematical matrix generator that constructs at least one of logistic, economic, and operational constraints usually encountered in a supply chain node. For example, the constructor can take data from a database and construct material balance and property balance equations, along with supply and demand constraints. These would represent the equation-oriented model of a node in the supply chain. In another embodiment, the math model constructor 222 implements an algorithm that fits parameters to a first-principles engineering model (e.g., solving parameter estimation problems where process data is used to fit kinetic reaction constants) and, in yet another embodiment, the math model constructor 222 implements a data-driven algorithm that creates an equation-oriented model 223a-n out of a black-box, input-output model 221a-n, using statistics, machine learning, and/or Artificial Intelligence techniques. An example of such functionality includes the generation of a surrogate model made of linear, polynomial, and exponential equations fitted to historical data. Those equations contain the inputs as independent variables, and the outputs as dependent variables Integration of Individual Mathematical Representations into One Integrated Value Chain Optimization Model The framework 220 integrates the equation oriented models 223a-n using linking structures 224a-n to create the single optimization model 225. In an embodiment, the linking structures 224a-n are based on user input indicating, amongst other examples, elements, decisions, variables, and equations, that connect the different nodes of the supply chain. In an embodiment, a user provides the linking structures 224a-n via a user interface. In the framework 220, each of the equation-oriented models 223a-n built by the math model constructor 222 are incorporated into a large-scale optimization model 225 and integrated through the linking structures 224a-n. An example linking structure 224a-n is an equation that sets the production of ethylene in an Olefins Plant (which is represented by a node and corresponding equation-oriented model e.g., 223a) to be equal to the consumption of ethylene in a Polymerization Plant (which is represented by a node and corresponding equation-oriented model e.g., 223b). The resulting model 225 may have the following characteristics: (i) millions of continuous variables, (ii) millions of equations and inequality constraints containing both linear and nonlinear terms, and (iii) hundreds of thousands of discrete variables.

Solving Large-Scale Previously Unsolvable Value Chain Optimization Models

In an embodiment, the framework 220 groups constraints in the optimization model 225 as linear or nonlinear. An example of a group of linear constraints, according to an embodiment, is the set material balance equation in a refinery. An example of a group of nonlinear constraints, in an embodiment, is the set of property balances that occur in pooling or blending of materials in a process plant. Variables, e.g., production of premium gasoline in a refinery, or the vapor pressure of a such a gasoline, of these constraints are assigned at least one of four categories (category 1, category 2, category 3, and category 4). With the exception of category 4, variables can appear in more than one category. According to an embodiment, the categories include: Category 1—variables that connect the supply chain nodes (i.e., variables in the linking structures 224a-n, such as ethylene exchanged between Olefins and Polymerization plants); Category 2—variables that appear in an objective function of one of the equation oriented models 223a-n, for example, sales of monomer to an external market; Category 3—variables that appear in linear constraints, for example, initial inventory of diesel in a refinery; and Category 4—variables that appear in nonlinear constraints exclusively, for example, the Octane Number of a gasoline calculated using nonlinear empiric equations.

After grouping the constraints and categorizing the variables, a master problem is defined by excluding all nonlinear constraints from the large-scale, integrated optimization model 225. The nonlinear constraints are excluded by replacing the nonlinear constraints with new constraints. These new constraints are created by substituting the variables in Category 4 for their lower and upper bound. The upper and lower bounds represent a linearized projection of the nonlinear constraints. These linearized constraints are added to the master problem.

In turn, the master problem which is a large-scale linear or mixed-integer linear model, is solved. This solving determines optimal values for variables in Categories 1 and 2. These values are passed back to the individual equation-oriented models 223a-n of nodes in the supply chain that contain nonlinear constraints.

The individual equation-oriented models 223a-n with the determined values for variables in categories 1 and 2 are solved. In an embodiment, the individual equation-oriented models 223a-n are solved using known methodologies (e.g., through linear programming). If the problem (solving the equation oriented models 223a-n) is feasible the algorithm converges; if the problem is infeasible, a new constraint is written exclusively in terms of Category 1 and Category 2 variables and added to the master problem 225, e.g., as another equation in the master problem 225. This constraint is referred to as a "cut" and it can be generated in several ways. For instance, the constraint can be generated through: (i) an integer cut, (ii) a Benders cut, (iii) a logic-based cut, and (iv) a cut generated through data-driven and/or artificial intelligence means.

The master problem is solved iteratively until the individual equation-oriented models 223a-n are all feasible. For example, after making the cut, the model 225 is updated to include any values determined by solving the equation-oriented models 223a-n. If at least one equation-oriented model 223a-n does not converge, a cut is generated and added to the model 225. This updated model is then solved as described above by grouping and categorizing variables and this process continues and repeats until each equation-oriented model 223a-n can be solved (converges).

Processing Output from the Integrated Value Chain Optimization Model

After obtaining a solution to the large-scale integrated optimization model 225, the optimal values 226 of the variables that connect the different supply chain nodes are passed to the individual models 221a-n. These are the Category 1 variables, which, when fixed in each of the models 221a-n of the supply chain, allow each model 221a-n to be ran independently. Since the integrated variables are solved to optimality, the individual solutions to each model 221a-n represent the best solution for the whole, integrated, supply-chain.

Value Chain Optimization—Illustrative Example

Below, in relation to FIGS. 3-8, an illustrative example and results are described. In this illustrative example, the objective is to define and solve an integrated oil to chemicals planning problem.

Figure 3:
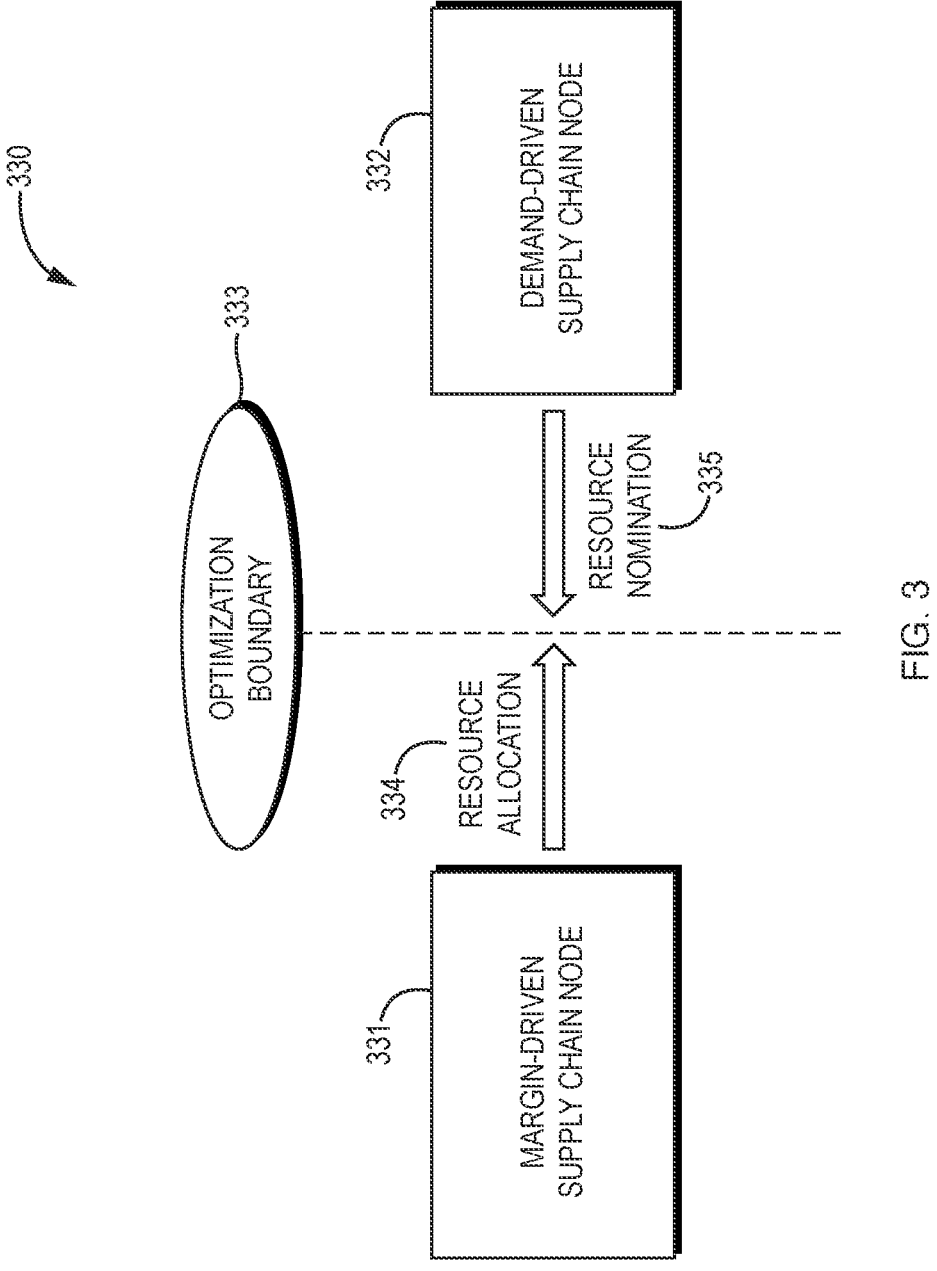
FIG. 3 is a simplified block diagram of a supply chain, i.e., value chain, that may be optimized utilizing embodiments.

FIG. 3 is a simplified block diagram of a supply, i.e., value, chain 330. The value chain 330 includes the margin-driven supply chain node 331 and demand-driven supply chain node 332. There is an optimization boundary 333 that is based on resource allocation 334, i.e., a process where the amount of resources assigned (allocated) to a production process is determined by what is most profitable (profit-driven), and resource nomination 335, i.e., required resources predetermined (nominated) by a demand-driven process, between the margin-driven node 331 and the demand-driven node 332. In an example, the margin-driven supply chain node 331 is a refinery that produces olefins and aromatics and the demand-driven supply chain node 332 creates derivatives and polymers using products from the margin-driven supply chain node 331. Embodiments can be used to determine an optimized resource allocation 334 from the margin-driven node 331 to the demand-driven node 332 and an optimized resource nomination 335 from the demand-driven node 332 to the margin-drive node 331.

An embodiment determines a single model to maximize value across the value chain 330. Such an embodiment aligns incentives (objective functions) for overall value creation. Embodiments streamline tools and work processes and replace existing heuristic-based methods for controlling supply chain nodes with rigorous optimization methods. This allows embodiments to optimize complex decisions across the value chain, e.g., crude and feedstock selection and optimization, synergies between refinery and chemical streams disposition and allocation, fuel versus chemical production, buy versus sell versus make along the value chain.

In the example described below, it is assumed that there are standalone Profit Impact of Market Strategy (PIMS) planning models for refinery and basic petrochemicals, and Supply Planner (SP) models for polymers and derivatives. It is also assumed that the PIMS and SP models solve in a reasonable time and provide quality solutions when ran independently. Further, it is assumed that there are relatively few variables that are common to both the SP and PIMS models compared to the total number of variables in both models.

Refining/basic petrochemicals and polymer/derivatives are usually different businesses that use different software solutions. Real-life refineries and basic petrochemicals models result in very complex Nonlinear Programming Problems (NLPs) that are modeled and solved with PIMS solutions, such as those provided by the Applicant. Realistic polymer plants and their complex distribution networks are modeled as large-scale Mixed-integer Linear Programming Problem (MILPs) and solved using software tools, such as AspenTech Supply Planner (SP). PIMS is specialized for NLPs and MINLPs with few binary variables but many bilinear, trilinear, and general nonlinear terms. SP is used for large-scale MILP models with thousands of binary variables.

There is a trend towards more integration of refineries, petrochemicals plants, and polymer facilities. At the software level, this translates into an incentive to integrate tools that have been traditionally kept separate. Since PIMS and SP both generate matrices of constraints that are solved as optimization problems, they could conceptually be integrated by adding connecting structure to represent the streams exchanged between both businesses. This connecting would allow the optimization of the whole system, in what is referred to herein as "Value Chain Optimization".

Integrating the mathematical programming models from real-life PIMS and SP models results in large-scale MINLP models. In order to solve the large-scale MINLP models within a reasonable computational time (5-10 minutes as a rule of thumb), embodiments implement a decomposition methodology. The description that follows describes an example of such functionality.

Figure 4:
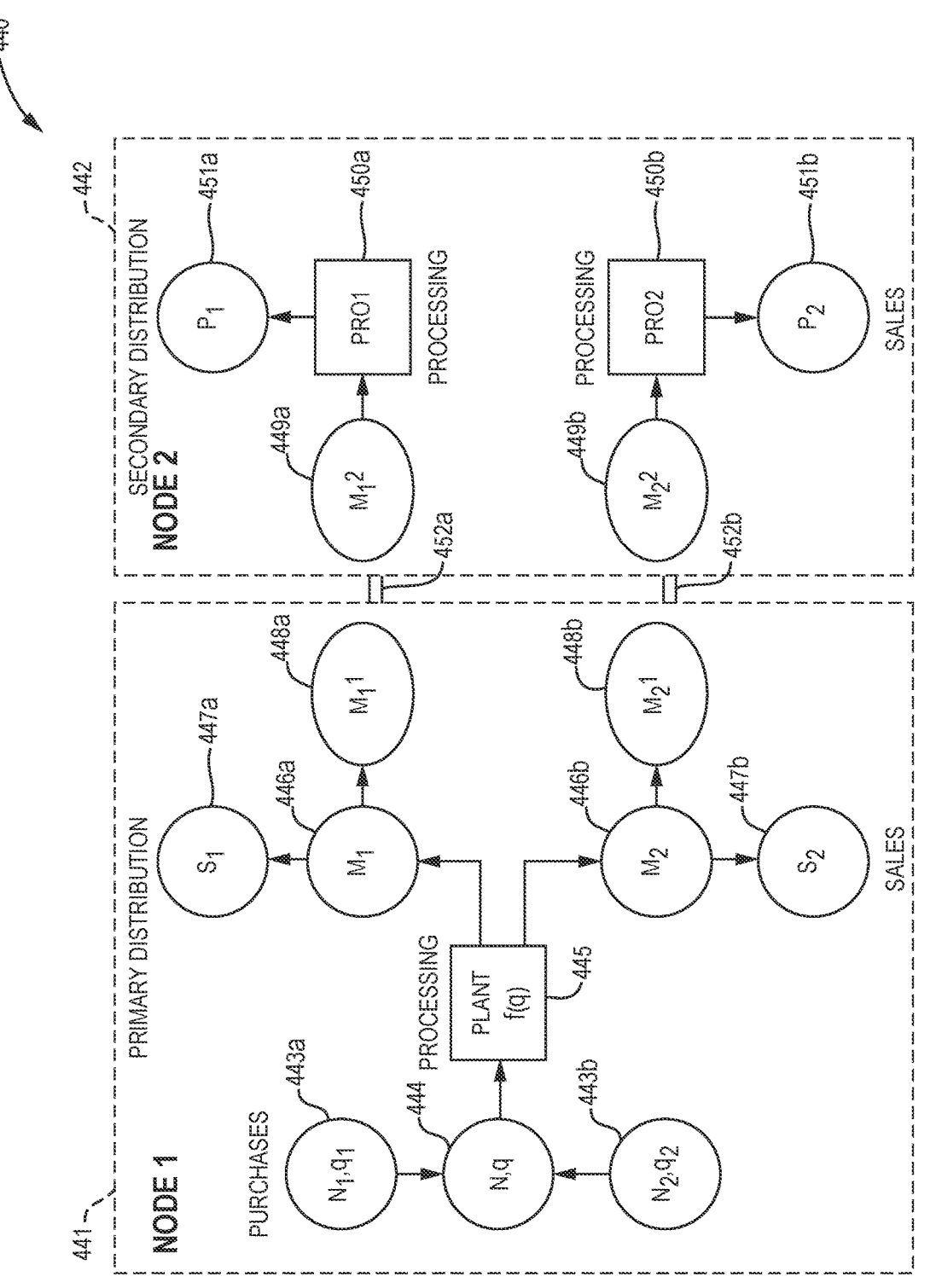
FIG. 4 is block diagram illustrating nodes in a supply chain and the relationship between the nodes, that may be optimized using embodiments.

FIG. 4 shows a simplified integrated model that has a section representing a node 441 that produces monomers from naphtha that would typically be modelled in PIMS and a section representing a node 442 that produces polymers from monomers that would be modelled in SP. For this illustrative example, the problem was generated outside of PIMS and SP by writing the constraints directly in a .mps file (text file) that can be read by a MINLP solver. However, for illustrative purposes, the monomer/olefins section 441 is referred to herein as the PIMS part of the model as if it had been created as a PIMS model. Likewise, the polymer section 442 is referred to herein as the SP part of the model.

The PIMS section 441 is an NLP that includes pooling of naphtha sources N1 443$a$ and N2 443$b$ into naphtha pool N 444. This pooling involves the calculation of property q, which corresponds to the naphtha pool specific gravity (spg). Naphtha 444 is turned into monomers 446$a$ and 446$b$, by plant 445, which can be sold (S variables 447$a$ and 447$b$) or transferred to polymer production (M$^{PIMS}$ variables 448$a$ and 448$b$).

The SP planner section 442 is an MILP that includes the transformation of monomers 449$a$ and 449$b$ into polymers 451$a$ and 451$b$, via processes 450$a$ and 450$b$, respectively. A requirement of minimum batch sizes in the polymerization is modeled using binary variables.

In FIG. 4 each dotted rectangle contains the elements of each separate application (node 441 and node 442), and the two equalities 452$a$ and 452$b$ connecting nodes 441 and 442 represent the connecting structure. In this example, equality 452$a$ indicates that M$^{PIMS}$ variable 448$a$ is equal to monomer 449$a$ and the equality 452$b$ indicates that M$^{PIMS}$ variable 448$b$ is equal to monomer 449$b$.

Equations (2)-(6) and (13)-(18) represent a simplification of the type of constraints in a PIMS model 441. This simplified model is referred to herein as "Primary Distribution". Equations (9)-(12), (19), and (20) represent a simplification of the type of constraints in the SP model 442. This simplified model is referred to herein as "Secondary Distribution". Equations (7), (8) connect sections 441 and 442, and equation (1) is an integrated objective function.

$$\text{Profit} = 9.5S_1 + 7.5S_2 + 15P_1 + 15P_2 - 5N_1 - 7N_2 \tag{1}$$

$$N = N_1 + N_2 \tag{2}$$

$$N\ spg = N_1 0.7 + N_2 0.8 \tag{3}$$

$$N\ spg = M_1 + M_2 \tag{4}$$

$$M_1 = S_1 + M_1^{Primary} \tag{5}$$

$$M_2 = S_2 M_2^{Primary} \tag{6}$$

$$M_1^{Primary} = M_1^{Secondary} \tag{7}$$

$$M_2^{Primary} = M_2^{Secondary} \tag{8}$$

$$P_1 = 0.9 M_1^{SP} \tag{9}$$

$$P_2 = 0.8 M_2^{Secondary} \tag{10}$$

$$y_1 5 \le P_1 \le y_1 8 \tag{11}$$

$$y_2 2 \le P_2 \le y_2 10^P \tag{12}$$

$$spg_{min} \le spg \le spg_{max} \tag{13}$$

$$N \le 20 \tag{14}$$

$$N_1 \le 8 \tag{15}$$

$$N_2 \leq 13 \tag{16}$$

$$S_1 \leq 7 \tag{17}$$

$$S_2 \leq 5 \tag{18}$$

$$P_1 + P_2 \geq 12 \tag{19}$$

$$y_1, y_2 \in \{0,1\} \tag{20}$$

All variables nonnegative $\tag{21}$

If the system 440, governed by the above equations (1)-(21) is solved without decomposition, e.g., using an existing MINLP solver provided by the Applicant, the optimal value of the objective function, equation (1), is 71.733. In this solution, objective value of 71.733 determined without decomposition, N=20, N1=8, N2=12, S=0, S2=0, P1=8, P2=5.05, $M_1^{Primary}$=8.89, and $M_2^{Primary}$=6.31.

If variables in equations (7) and (8) are fixed, the PIMS section 441 and SP section 442 can be solved independently. An assumption, according to an embodiment, is that individual node models, e.g., Secondary Distribution 442 and Primary Distribution 441 models, are used that can be solved independently in an acceptable amount of time (5-10 minutes max). From that perspective, variables $M_1^{Primary}$, $M_1^{Secondary}$, $M_2^{Primary}$, $M_2^{Secondary}$ are complicating variables in the sense that once they are fixed, the problem becomes significantly easier to solve. Each of the decomposed problems, i.e., the individual problems for the nodes 441 and 442, corresponds exactly to an independent Secondary Distribution model and independent Primary Distribution model.

The notion of complicating variables evokes the idea of Benders Decomposition. The problem could alternatively be interpreted as having complicating constrains that would suggest the use of Lagrangean Decomposition. Furthermore, it is known (although it is not evident in the illustrative example) that a problem with linearized constraints is easier to solve than the original MINLP. This last notion could lead to a Linear/Nonlinear decomposition strategy.

A methodology implemented by embodiments is a mix of Benders and Linear/Nonlinear approaches. Compared to standard Benders, embodiments create a much stronger Master Problem from iteration zero. Compared to a pure Linear/Nonlinear approach, embodiments have the strength of generating benders feasibility and optimality cuts to enrich the linear subproblem.

Decomposition Methodology Applied to the Illustrative Example

Master Problem First Iteration

For the first iteration $M_1^{Primary}$, $M_1^{Secondary}$, $M_2^{Primary}$, $M_2^{Secondary}$ are defined as complicating variables in the Benders sense. However, instead of just writing the problem in terms of those variables, an embodiment adds all the linear structure of the original MINLP to strengthen the master problem, i.e., a "linearized" version of an integrated model, e.g., 225. Such an embodiment goes even further and adds linearized relaxations of the original nonlinear constraints. Embodiments can afford to do this because the resulting master problem is still easy to solve. The resulting master problem is easy to solve because such an embodiment starts by assuming that there is an Secondary Distribution model that is easy to solve by itself, and because the dimensionality of realistic Primary Distribution models (441), such as PIMS models in the industry, is about at least an order of magnitude smaller than realistic instances of the original Secondary Distribution model (442), such as those SP models used in the industry.

The master problem at the first iteration substitutes the nonlinear constraints N*spg=N$_1$ 0.7+N$_2$ 0.8, N*spg=M$_1$+M$_2$, and 0.1125<=spg<=1.125 for linear relaxations thereof. The master problem at this first iteration is governed by the following equations:

$$\text{Profit} \leq \pi_{S,1}S_1 + \pi_{S,2}S_2 + \pi_{P,1}P_1 + \pi_{P,2}P_2 - \pi_{N,1}N_1 - \pi_{N,2}N_2 \tag{1}$$

s.t. (such that)
Equations (2) and (5)-(21) as above.

$$N\,spg_{min} \leq N_1 0.7 + N_2 0.8 \tag{3a}$$

$$N_1 0.7 + N_2 0.8 \leq N\,spg_{max} \tag{3b}$$

$$N\,spg_{min} \leq M_1 + M_2 \tag{4a}$$

$$M_1 + M_2 \leq N\,spg_{max} \tag{4b}$$

The linearization strategy used is explained in detail below.

The master problem is an MILP. The master problem is a relaxation of the original problem. In this first iteration the optimal solution of the master problem is 156.47, N=20, N1=8, N2=12, S1=1.1, S2=0. $\hat{P}_1$=8, $\hat{P}_2$=10, $\hat{M}_1^{PIMS}$=8.89, $\hat{M}_2^{PIMS}$=12.5 (with hats) are the values at the optimal solution of the master. They are fixed in the subproblem.

Subproblem First Iteration

In the subproblem, the values of the complicating variables are fixed and the resulting problem (with the fixed complicating variables) is solved. The subproblem at the first iteration is governed by the equations that follow.

$$\text{Profit} = \pi_{S,1}S_1 + \pi_{S,2}S_2 + \pi_{P,1}8 + \pi_{P,2}12 - \pi_{N,1}N_1 - \pi_{N,2}N_2 \tag{1}$$

$$N = N_1 + N_2 \tag{2}$$

$$N\,spg = N_1 0.7 + N_2 0.8 \tag{3}$$

$$N\,spg = M_1 + M_2 \tag{4}$$

$$M_1 = S_1 + 8.89 \tag{5}$$

$$M_2 = S_2 + 12.5 \tag{6}$$

$$spg_{min} \leq spg \leq spg_{max} \tag{13}$$

$$N \leq 20 \tag{14}$$

$$N_1 \leq 8 \tag{15}$$

$$N_2 \leq 13 \tag{16}$$

$$S_1 \leq 7 \tag{17}$$

$$S_2 \leq 5 \tag{18}$$

The subproblem is an NLP. The subproblem is a lower bound of the original problem. In the first iteration the subproblem is infeasible. Therefore, the following feasibility problem is created.

$$\text{minimize Infeasibility} = \Sigma \mu_i \tag{1}$$

$$N = N_1 + N_2 + \mu_1 - \mu_2 \tag{2}$$

$$N\,spg = N_1 0.7 + N_2 0.8 + \mu_3 - \mu_4 \tag{3}$$

$$N\,spg = M_1 + M_2 + \mu_5 - \mu_6 \tag{4}$$

$$M_1 = S_1 + 8.89 + \mu_7 - \mu_8 \tag{5}$$

$$M_2 = S_2 + 12.5 + \mu_9 - \mu_{10} \tag{6}$$

$$spg_{min} \leq spg \leq spg_{max} \qquad (13)$$

$$N \leq 20 + \mu_{11} \qquad (14)$$

$$N_1 \leq 8 + \mu_{12} \qquad (15)$$

$$N_2 \leq 13 + \mu_{13} \qquad (16)$$

$$S_1 \leq 7 + \mu_{14} \qquad (17)$$

$$S_2 \leq 5 + \mu_{15} \qquad (18)$$

$$0 \leq \mu_i \qquad (22)$$

The following Benders Feasibility Cut is created from the solution of the feasibility problem:

$$M_1 + M_2 \leq 15.3$$

This feasibility cut has a nice physical interpretation. In equation (4) the amount of monomer produced is limited by the total naphtha purchased times the naphtha pool spg. The feasibility cut constrains the total monomer $(M_1 + M_2)$ to be less than the active constraint on naphtha $N \leq 20$ times the spg calculated by solution to the subproblem (~0.75).

Second Iteration of Master Problem

For the second iteration of solving the master problem a relaxation of non-linear constraints, such as the one described above, is once again implemented. Further, a new equation derived from the subproblem solution that improves the master is employed. Specifically, the second iteration of the master problem now includes constraint (23) below, which is the infeasibility cut derived from the subproblem. For the second iteration the following equations apply:

$$\text{Profit} = \pi_{S,1} S_1 + \pi_{S,2} S_2 + \pi_{P,1} P_1 + \pi_{P,2} P_2 - \pi_{N,1} N_1 - \pi_{N,2} N_2 \qquad (1)$$

s.t.

Equations (2) and (5)-(21) as above.

$$Nq_{min} \leq N_1 q_1 + N_2 q_2 \qquad (3a)$$

$$N_1 q_1 + N_2 q_2 \leq Nq_{max} \qquad (3b)$$

$$Nq_{min} \leq M_1 + M_2 \qquad (4a)$$

$$M_1 + M_2 \leq Nq_{max} \qquad (4b)$$

$$M_1 + M_2 \leq 15.3 \qquad (23)$$

The solution to the second iteration of the master problem is 140.9, N=20, N1=8, N2=12, S1=7, S2=0.2, P1=8, P2=5.13, $M_1^{PIMS}$=8.89, and $M_2^{PIMS}$=6.4. This solution leads to a feasible subproblem solution.

Convergence of the Methodology

Starting on the second iteration the subproblem is feasible. The problem converges in four iterations. The feasibility cut already described plus the two optimality cuts below are added to the master problem throughout the methodology iterations:

$$M_1 + M_2 \leq 15.3$$

$$\text{Profit} \leq 180 + 15(P_1 + P_2) - 20(M_1^{PIMS} + M_2^{PIMS})$$

$$\text{Profit} \leq 20.4 + 15(P_1 + P_2) - 9.5(M_1^{PIMS} + M_2^{PIMS})$$

Figure 5:
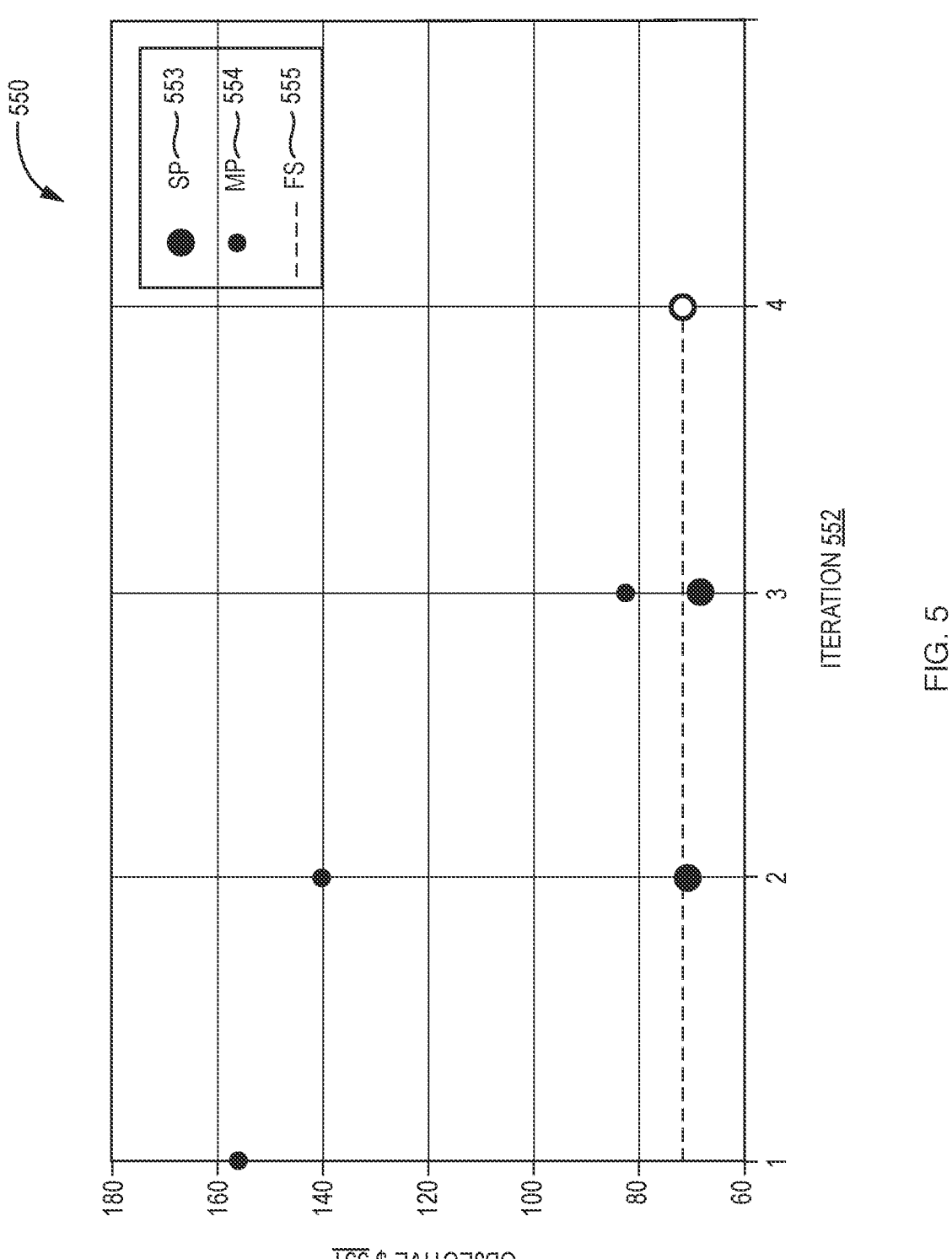
FIG. 5 is a plot showing result convergence of an embodiment.

The convergence of the methodology is shown in the plot 550 of FIG. 5 where the objective value 551 is plotted versus the iterations 552. The plot 550 includes series for the subproblem 553, master problem 554, and full space (FS)

solution 555. As noted, the plot 550 shows that the master problem 554 and subproblem 553 converge at the fourth iteration 552.

Formal Definition of Decomposition Methodology

1. Define Integrated Planning Problem (IP):

$$\max_{x,y,z} \{ f_{Primary}(x, y) + f_{Secondary}(z, y) \} \qquad (1)$$

$$g(x, y) \leq 0 \quad \text{(all the original Primary Distribution inequalities)} \qquad (2)$$

$$h(x, y) = 0 \quad \text{(all the original Primary Distribution equalities)} \qquad (3)$$

$$Az + By \leq d \quad \text{(all Secondary Distribution equation)} \qquad (4)$$

$$x, y, z \geq 0 \qquad (5)$$

$$x \in \mathbb{R}^{n1} U\{0, 1\}^{p1}$$

$$z \in \mathbb{R}^{n2} U\{0, 1\}^{p2}$$

$$y \in \mathbb{R}^{n3}$$

Where $f_{Primary}$, g, and h represent the PIMS model; $f_{Secondary}$ and the constraints $Az+By \leq d$ represent the Secondary Distribution model; n1>>p1—Primary Distribution has significantly more continuous variables than discrete (tens of thousands vs. tens, or at most hundreds); n2>p2—Secondary Distribution has many more continuous than discrete variables (hundreds of thousands vs. thousands); n2>>n3, n1>>n3—Secondary Distribution and Primary Distribution share very few variables (tens or hundreds, at most); g and h are non-convex.

2. Customized Implementation of Benders to the Integrated Planning of Oil to Chemicals Decompositions includes the following steps (a)-(i):

Step (a): Partition the x variables in two: $x^S$ (Stream Qualities), $x^M$ (all other variables, mostly material flows). $x^S$ are all the qualities (Sulfur, RON, etc.) that appear predominantly in nonlinear terms in blending equations. In the illustrative equation f1q1+f2q2−f3q3=0, the q variables belong to $x^S$ and the f variables belong to $x^M$.

Step (b): The complicating variables are y.

Step (c): Define a relaxed master problem (MR) by substituting nonlinear constraints g and h for linearized relaxations.

$$\max_{x^M, y, z} \pi \qquad (6)$$

s.t.

$$\pi \leq f_{Primary}(x^M, y) + f_{Secondary}(z, y) \qquad (7)$$

$$Az + By \leq d \qquad (8)$$

$$Dx^M + Fy \leq 0 \qquad (9)$$

$$x^M, y, z \geq 0 \qquad (10)$$

$$x^M \in X^M$$

$$z \in \mathbb{R}^{n2} U\{0, 1\}^{p2}$$

$$y \in \mathbb{R}^{n3}$$

Step (d): Bilinear and trilinear terms of the type $x_i^M x_j^S$ and $x_i^M x_j^S x_k^S$ constitute all or most of the nonlinearities in constraints g and h. An implementation linearizes the non-linear constraints with these terms using a relaxed version of McCormick envelopes. The linearization strategies are described in detail in the next sections.

Step (e): The result of the linearization steps is that variables $x^S$ are substituted by their upper and lower bounds, thus constraint set $Dx^M+Fy\leq 0$ does not contain $x^S$.

Step (f): Define the subproblem (S) for a fixed set of $y^k$, $z^k$. This is the original PIMS problem where the complicating variables $y^k$ are fixed. The variables $z^k$ are not complicating variables, but they can be fixed from the solution of the master, as will be seen below.

$$S = \max_{x^M}\{f_{Primary}(x^M, y^k) + f_{Secondary}(z^k, y^k)\} \tag{11}$$

s.t.

$$g(x^M, y^k, x^C, x^S) \leq 0 \tag{12}$$

$$h(x^M, y^k, x^C, x^S) = 0 \tag{13}$$

$$x^M \geq 0 \tag{14}$$

$$x^s \in X^S$$

$$x^M \in X^M$$

Step (g): The solution of the relaxed master (MR) (a relaxed problem without the Benders cuts 16b and 20) is a valid upper bound for the original integrated problem (IP). The solution of the subproblem (S) is a lower bound for (IP). A Benders cut can be added to (MR) for every optimal solution of (S), of the form:

$$\pi \leq f_{Primary}(x^{M^k}, y) + f_{Secondary}(z, y) + \mu^k g(x^{M^k}, y, x^{S^k}) + \lambda^k h(x^{M^k}, y, x^{S^k}).$$

Any $y^k$ optimal in (MR) for which there is no solution in (S) renders the corresponding dual of (S) unbounded. Then, such an embodiment cuts the infeasible $y^k$ by applying a Benders feasibility cut $$\mu^k g(x^{M^k}, y, x^{S^k}) + \lambda^k h(x^{M^k}, y, x^{S^k}) \leq 0.$$

Step (h): Define the Master Problem (M) as:

$$\max_{x^M, y, z} \pi \tag{15}$$

s.t.

$$\pi \leq f_{PIMS}(x^M, y) + f_{SP}(z, y) \tag{16a}$$

$$\pi \leq f_{PIMS}(x^{M^k}, y) + f_{SP}(z, y) + \tag{16b}$$

$$\mu^k g(x^{M^k}, y, x^{S^k}) + \lambda^k h(x^{M^k}, y, x^{S^k}) \text{ for } k = 1, \dots, K^{Feas}$$

$$Az + By \leq d \tag{17}$$

$$Dx^M + Fy \leq 0 \tag{18}$$

$$x^M y, z \geq 0 \tag{19}$$

$$\mu^k g(x^{M^k}, y, x^{S^k}) + \lambda^k h(x^{M^k}, y, x^{S^k}) \leq 0 \text{ for } k = 1, \dots, K^{Infeas} \tag{20}$$

$$x^M \in X^M$$

$$z \in \mathbb{R}^{n2-p2} U\{0, 1\}^{p2}$$

$$y \in \mathbb{R}^{n3}$$

Step (i): Solve the integrated planning problem (IP) by iteratively solving (M) and (S) and adding feasibility cuts to problem (M) until the optimal solution of (M) and (S) are within a predetermined tolerance. In an embodiment, the tolerance is defined as the percentage difference between the solution of (M) and (S). Typical values for this tolerance, according to an embodiment, are 0.5 to 5%.

Numerical Results with Real-Life Models

Figure 6:
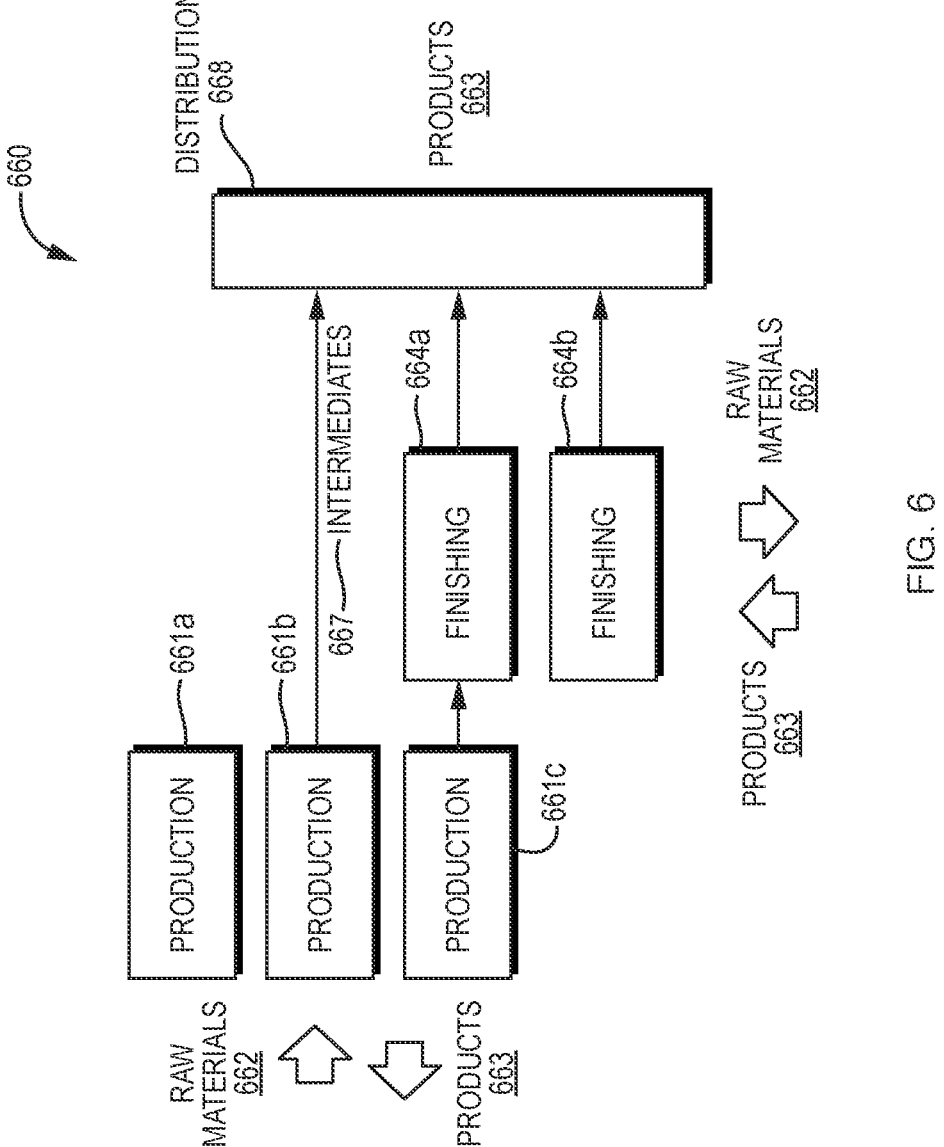
FIG. 6 is a simplified block diagram of a system that may be optimized using embodiments.

FIG. 6 is a simplified block diagram of a system 660 which may be optimized using embodiments. The system 660 includes the production nodes 661a-c which correspond to respective real-world locations, e.g., production plants. The nodes 661a take raw materials 662 and, from the raw materials 662, generate products 663. Further, the system 660 includes the finishing nodes 664a-b (e.g., finishing plants), which likewise take raw materials 662 and, from the raw materials 662, generate products 663. Moreover, the finishing node 664a performs further processes on output of the production node 661c. In the system 660, production node 661b generates intermediates 667 which are sent to distribution node 668. It is noted that the node 668 may represent a plurality of distribution nodes, e.g., ten. Further, the products 663 from the finishing nodes 664a-b are sent to the distribution node 668 which provides the products 663 to one or more points downstream, e.g., customers. It should be understood that the nodes 661a-c, 664a-b, and 668, may represent any locations in a supply chain for which optimization is desired. Further, embodiments are not limited to the structure and relationships shown in FIG. 6 and other supply chains may be optimized.

In an embodiment, the MINLP model that results from integrating the SP and PIMS models into one large-scale MINLP representing the system 660 includes 482,077 variables (960 integers); 185,483 constraints (14,895 non-linear); 2,179,608 non-zeros (91,972 non-linear). Further, for the example results described below, there are 10 distribution nodes and 3 time periods, corresponding to three months of operation.

For comparison, the aforementioned MINLP model was solved by "brute-force" using a MINLP solver, XLSP, provided by Applicant. XLSP does not guarantee global optimality. The results 770 of the "brute-force" solving are shown in FIG. 7. The "brute-force" results 770 include the table 771 which has columns showing iterations 772, variable convergence function 773, residual convergence function 774, objective convergence function 775, and objective function value 776. The results 770 also include table 777 that shows iterations 778 and the time 779 for each iteration. The "brute-force" method determined a solution of €3,513 and took a total of 18 minutes and 15 seconds to determine the solution.

FIG. 8 shows the results 880 of the same problem using the decomposition methodology described therein. It is noted that the Master Problem and Subproblem are solved using the XSLP solver. The 20 iterations shown in the table 881 are "internal" XSLP iterations used to solve the NLP. The solution of the problem only requires 1 and a half "External" Iterations of the Decomposition algorithm (2 Master problems and 1 Subproblem), which are shown in the table 888. The results 880 include the table 881 which has columns showing iterations 882, variable convergence function 883, residual convergence function 884, objective convergence function 885, objective function value 886, and non-linearity ratio 887. The results 880 further include the table 895 which shares the column headings 882-887 with table 881. The table 895 represents the results of the XSLP solver output after solving the second master problem. It can be seen that the objective function value 886 in the table 895 matches the upper bound 892 of the table 888 discussed below. The table 895 is a single line as opposed to multiple lines for the output from the Subproblem (table 881) because the master is a linear problem and the subproblem is nonlinear (requiring multiple iterations).

The results 880 also include table 888 that shows iterations 889, type 890, time 891, Upper Bound (Solution of the Master Problem) 892, Lower Bound (Solution to the Subproblem) 893, and gap (difference between the upper and lower bound) 894. In the table 888, the values from iteration 3 were derived utilizing "cuts" or additional equations derived from the solution of the Subproblem in iteration 2 (row 2). The decomposition result determined a solution of €3,532 and took a total of 7 minutes and 10 seconds to reach the solution. As such, the decomposition methodology determined a better solution in less than half the time compared to the full space solution.

External Inputs

Embodiments may utilize a variety of input data. Such input data may include one or more models created for different nodes in the integrated supply chain, e.g., the models 221*a-n*. These models have been created and ran using software applications, computer programs, or statistical tools, for different nodes in the integrated supply chain. Such models have been used for planning, scheduling, and/or operation of each of the nodes.

Models of the supply, e.g., the models 221*a-n*, include any kind of representation of a node in the supply chain that has an input-output structure where the inputs can be manipulated to optimize the outputs with respect to an objective function or performance indicator. Embodiments may utilize software applications, computer programs, or statistical tools that are known to those of skill in the art to generate those models.

Elements of Embodiments

Embodiments provide a methodology and computational tools to derive a set of mathematical constraints and equations using individual models of each node in a supply chain. Similarly, embodiments include methodologies and computational tools to generate mathematical structure, e.g., linking structures 224*a-n* to connect the different models in the supply chain.

Embodiments also include software element(s) that can integrate the different models and their connecting structures into a single large-scale model, e.g., the model 225. Further, embodiments provide a software element that can optimally solve the large-scale model maximizing the value creation across the supply chain.

Embodiments implement an algorithmic strategy that exploits the business characteristics (supply, demand, and product specifications), the physical characteristics (material balances and other conservation laws) and the mathematical characteristics (linear and nonlinear) of the large-scale model to enable and expedite solving the large-scale model. In embodiments, the large-scale model is of such a size that it is not possible to solve using existing technologies. Further still, embodiments implement an architectural set-up that allows the exchange of information between the individual models used as input for embodiments and the integrated value chain optimization model.

Output of Embodiments

Embodiments determine optimal or close to optimal values for the variables that are involved in the interface of different supply chain nodes. Such variables are often the driving force for integration of nodes in supply chains, e.g., petroleum and chemical supply chains. Example outputs, e.g., 226, of embodiments include the optimal quantities of materials to be exchanged between an oil refinery and a chemical plant belonging to the integrated supply chain. The output of embodiments can take any form capable of communicating the determined values or other such determinations made by embodiments described herein. For example, embodiments can provide a data structure, file, or signal that can pass the values of the variables back to the individual models used for each node in the supply chain.

Advantages Over Existing Software Applications

Existing software applications require that every node in the supply chain be modeled within the application, or at least within a suite of applications that are restricted by tight compatibility requirements. Embodiments have no such requirements and operate with any node modes that have an input-output structure from which a mathematical model of any kind can be extracted. This includes explicit algebraic equations or any black box model from which a data-driven mathematical model can be extracted.

Most existing software applications are limited to linear and mixed-linear optimization capabilities. Those applications that can include nonlinear elements are restricted to small problem sizes. Embodiments have the capabilities to solve very large-scale Mixed-Integer Nonlinear models.

Advantages Over Business Rules and Heuristic Methods

Business rules and heuristic methods are not based on rigorous analytical and optimization principles. As such, business rules and heuristic methods almost universally fall short of maximal value creation across the supply chain. The exception being very trivial problem instances. In contrast, embodiments provide optimized results for controlling nodes of a supply chain.

Advantage Over Academic Mathematical Models

Academic models for determining optimal solutions of large-scale supply chain models do not contain enough detail of each supply chain node to be of practical use. Moreover, academic models are not designed for the lay user and require post-graduate level expertise to set up and run.

Computer Support

Figure 9:
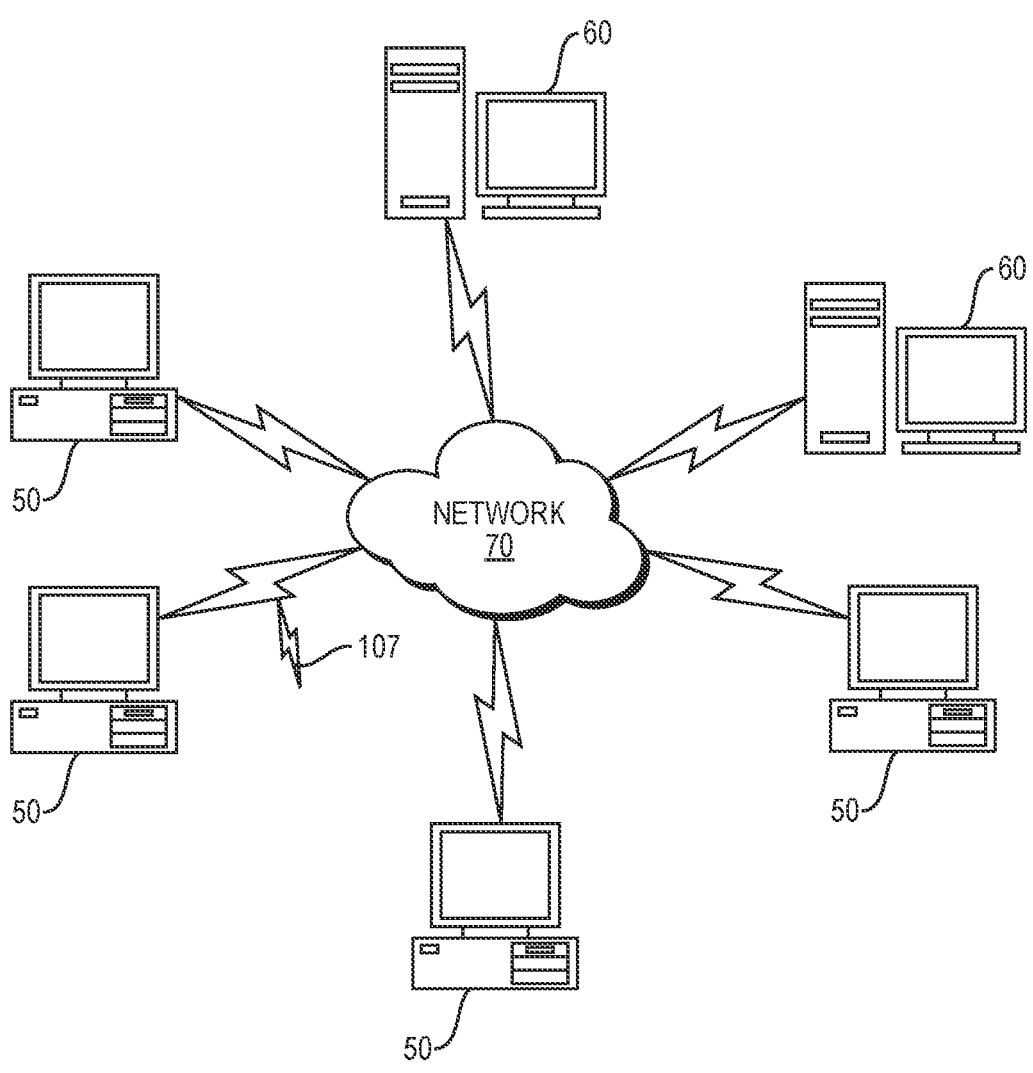
FIG. 9 is a schematic view of a computer network environment in which embodiments of the present invention may be deployed.

FIG. 9 illustrates a computer network or similar digital processing environment in which embodiments of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 10:
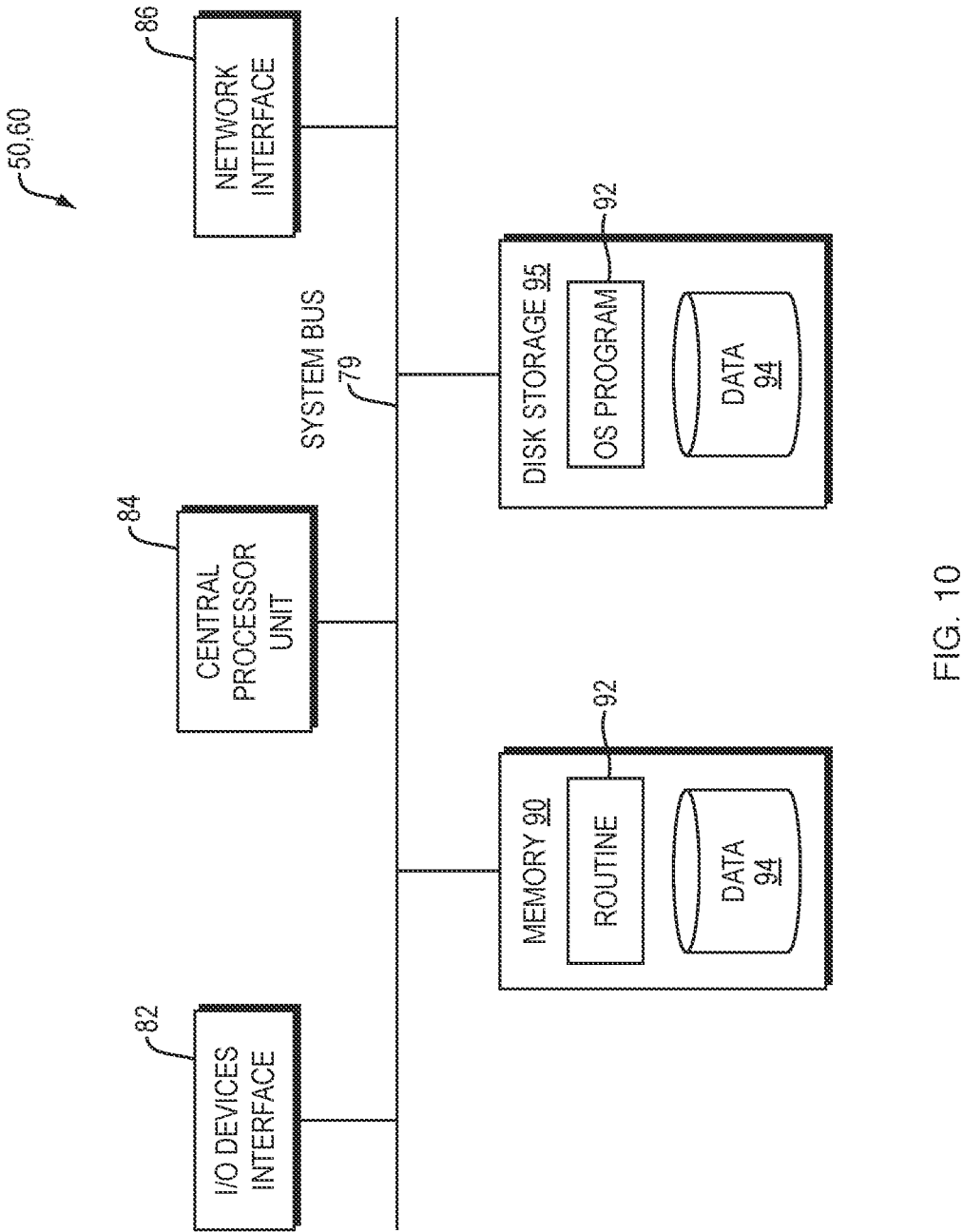
FIG. 10 is a block diagram of a computer node in the network of FIG. 9.

FIG. 10 is a diagram of the internal structure of a computer (e.g., client processor/device 50 or server computers 60) in the computer system of FIG. 9. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 9). Memory 90 provides volatile storage for computer software instructions 92 and data 94 used to implement an embodiment of the present invention (e.g., the method 100 of FIG. 1 detailed above). Disk storage 95 provides non-volatile storage for computer software instructions 92 and data 94 used to implement an embodiment of the present invention. The memory 90 and disk storage 95 can be configured to store the various input-output models, equation oriented models, and optimization models described herein, along with the variables associated with said models, e.g., the linking structure and the interface variables. Moreover, the memory 90 and disk storage 95 can be configured to implement the framework described hereinabove in relation to FIG. 2 along with the associated models and variables used to implement the framework. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for automatically controlling physical operations in an industrial supply chain, the method comprising, by a processor:

for each node in a supply chain where the supply chain is formed of multiple nodes:

obtaining, in memory associated with the processor, an input-output model for the node; and generating an individual equation-oriented model using the obtained input-output model corresponding to the node;

integrating the generated individual equation-oriented models of the multiple nodes with a linking structure to form an optimization model of the supply chain, the optimization model of the supply chain including a plurality of variables;

for each variable of the plurality of variables included in the optimization model, assigning, in a data structure in the memory, at least one respective category to the variable selected from a group of three or more categories, wherein the at least one respective category assigned to each variable is: (i) variables connecting nodes in the supply chain, (ii) variables in an objective function, (iii) variables in linear constraints in the optimization model, or (iv) variables exclusively in nonlinear constraints;

using the at least one respective category assigned to each variable of the plurality of variables in the data structure in the memory, solving the optimization model of the supply chain to determine a value for at least one variable of the plurality, wherein solving the optimization model using the at least one respective category assigned to each variable includes:

applying a respective solving procedure, to each variable of the plurality of variables, where each respective solving procedure is dictated by the at least one respective category assigned to the variable in the data structure in the memory;

grouping nonlinear constraints in the optimization model; and removing the grouped nonlinear constraints from the optimization model by:

for each nonlinear constraint, creating a corresponding linear constraint by substituting each variable categorized as exclusively in the nonlinear constraint, with a lower and upper bound of the variable, wherein the lower and upper bound of the variable represent a linearized projection of the nonlinear constraints; and replacing each nonlinear constraint in the optimization model with the created corresponding linear constraint; and outputting a signal indicating the determined value and automatically controlling a given node of the multiple nodes in the supply chain in accordance with the determined value by one or more computing devices at the given node implementing instructions responsive to the signal to control physical operations at the given node.

2. The method of claim 1 wherein each obtained input-output model includes one or more inputs and one or more outputs, wherein the one or more inputs are configured to be manipulated to optimize the one or more outputs with respect to an objective function or performance indicator.

3. The method of claim 1 wherein generating an individual equation-oriented model comprises at least one of:

processing a given input-output model to generate a matrix indicating logistic, economic, and operational constraints for a supply chain node corresponding to the given input-output model;

using a given input-output model and fitting parameters to a first-principles engineering model; and processing a given input-output model using at least one of statistics, machine learning, and artificial intelligence.

4. The method of claim 1 wherein the linking structure includes at least one of:

mathematical variables and equations connecting the generated individual equation-oriented models.

5. The method of claim 1 wherein solving the optimization model comprises:

grouping linear constraints in the optimization model;

solving the optimization model with the removed nonlinear constraints to determine optimal values for variables categorized as connecting nodes in the supply chain or variables in an objective function;

passing the determined optimal values back to given individual equation-oriented models that contain the nonlinear constraints;

solving the given individual equation-oriented models, wherein:

if an individual equation-oriented model is feasible the solving converges; and if an individual equation-oriented model is infeasible, the solving does not converge and, in response, (i) creating a cut constraint in terms of variables categorized as at least one of: connecting nodes in the supply chain and in an objective function and (ii) adding the cut constraint to the optimization model; and iteratively solving the optimization model until solving each individual equation-oriented model converges.

6. The method of claim 1 further comprising:

obtaining the outputted signal;

determining a control parameter of the given node using the determined value, from the obtained signal, in a given individual equation-oriented model indicating behavior of the given node; and operating the given node in accordance with the determined control parameter.

7. The method of claim 1 wherein nodes in the supply chain include: a refinery node, a petrochemical plant node, and a polymer plant node.

8. A computer system for automatically controlling physical operations in an industrial supply chain, the system comprising:

a processor; and a memory with computer code instructions stored thereon, the processor and the memory, with the computer code instructions, being configured to cause the system to:

for each node in a supply chain where the supply chain is formed of multiple nodes:

obtain, in the memory, an input-output model for the node; and generate an individual equation-oriented model using the obtained input-output model corresponding to the node;

integrate the generated individual equation-oriented models of the multiple nodes with a linking structure to form an optimization model of the supply chain, the optimization model of the supply chain including a plurality of variables;

for each variable of the plurality of variables included in the optimization model, assign, in a data structure in the memory, at least one respective category to the variable selected from a group of three or more categories, wherein the at least one respective category assigned to each variable is: (i) variables connecting nodes in the supply chain, (ii) variables in an objective function, (iii) variables in linear constraints in the optimization model, or (iv) variables exclusively in nonlinear constraints;

using the at least one respective category assigned to each variable of the plurality of variables in the data structure in the memory, solve the optimization model of the supply chain to determine a value for at least one variable of the plurality, wherein solving the optimization model using the at least one respective category assigned to each variable includes:

applying a respective solving procedure, to each variable of the plurality of variables, where each respective solving procedure is dictated by the at least one respective category assigned to the variable in the data structure in the memory;

grouping nonlinear constraints in the optimization model; and removing the grouped nonlinear constraints from the optimization model by:

for each nonlinear constraint, creating a corresponding linear constraint by substituting each variable categorized as exclusively in the nonlinear constraint, with a lower and upper bound of the variable; and replacing each nonlinear constraint in the optimization model with the created corresponding linear constraint; and output a signal indicating the determined value and automatically control a given node of the multiple nodes in the supply chain in accordance with the determined value by one or more computing devices at the given node implementing instructions responsive to the signal to control physical operations at the given node.

9. The system of claim 8 wherein each obtained input-output model includes one or more inputs and one or more outputs, wherein the one or more inputs are configured to be manipulated to optimize the one or more outputs with respect to an objective function or performance indicator.

10. The system of claim 8 wherein, in generating an individual equation-oriented model, the processor and memory, with the computer code instructions are further configured to cause the system to perform at least one of:

processing a given input-output model to generate a matrix indicating logistic, economic, and operational constraints for a supply chain node corresponding to the given input-output model;

using a given input-output model and fitting parameters to a first-principles engineering model; and processing a given input-output model using at least one of statistics, machine learning, and artificial intelligence.

11. The system of claim 8 wherein the linking structure includes at least one of:

mathematical variables and equations connecting the generated individual equation-oriented models.

12. The system of claim 8 wherein, in solving the optimization model, the processor and the memory, with the computer code instructions, are configured to cause the system to:

group linear constraints in the optimization model;

solve the optimization model with the removed nonlinear constraints to determine optimal values for variables categorized as connecting nodes in the supply chain or variables in an objective function;

pass the determined optimal values back to given individual equation-oriented models that contain the nonlinear constraints;

solve the given individual equation-oriented models, wherein:

if an individual equation-oriented model is feasible the solving converges; and if an individual equation-oriented model is infeasible, the solving does not converge and, in response, (i) creating a cut constraint in terms of variables categorized as at least one of: connecting nodes in the supply chain and in an objective function and (ii) adding the cut constraint to the optimization model; and iteratively solve the optimization model until solving each individual equation-oriented model converges.

13. The system of claim 8 wherein, the processor and the memory, with the computer code instructions, are configured to cause the system to:

obtain the outputted signal;

determine a control parameter of the given node using the determined value, from the obtained signal, in a given individual equation-oriented model indicating behavior of the given node; and operate the given node in accordance with the determined control parameter.

14. The system of claim 8 wherein nodes in the supply chain include: a refinery node, a petrochemical plant node, and a polymer plant node.

15. A computer program product for automatically controlling physical operations in an industrial supply chain, the computer program product comprising:

one or more non-transitory computer-readable storage devices and program instructions stored on at least one of the one or more storage devices, the program instructions, when loaded and executed by a processor, cause an apparatus associated with the processor to:

for each node in a supply chain where the supply chain is formed of multiple nodes:

obtain, in memory associated with the processor, an input-output model for the node; and generate an individual equation-oriented model using the obtained input-output model corresponding to the node;

integrate the generated individual equation-oriented models of the multiple nodes with a linking structure to form an optimization model of the supply chain, the optimization model of the supply chain including a plurality of variables;

for each variable of the plurality of variables included in the optimization model, assign, in a data structure in the memory, at least one respective category to the variable selected from a group of three or more categories, wherein the at least one respective category assigned to each variable is: (i) variables connecting nodes in the supply chain, (ii) variables in an objective function, (iii) variables in linear constraints in the optimization model, or (iv) variables exclusively in nonlinear constraints;

using the at least one respective category assigned to each variable of the plurality of variables in the data structure in the memory, solve the optimization model of the supply chain to determine a value for at least one variable of the plurality, wherein solving the optimization model using the at least one respective category assigned to each variable includes:

applying a respective solving procedure, to each variable of the plurality of variables, where each respective solving procedure is dictated by the at least one respective category assigned to the variable in the data structure in the memory;

grouping nonlinear constraints in the optimization model; and removing the grouped nonlinear constraints from the optimization model by:

for each nonlinear constraint, creating a corresponding linear constraint by substituting each variable categorized as exclusively in the nonlinear constraint, with a lower and upper bound of the variable; and replacing each nonlinear constraint in the optimization model with the created corresponding linear constraint; and output a signal indicating the determined value and automatically control a given node of the multiple nodes in the supply chain in accordance with the determined value by one or more computing devices at the given node implementing instructions responsive to the signal to control physical operations at the given node.

16. The computer program product of claim 15 wherein, in solving the optimization model, the program instructions, when loaded and executed by the processor, cause the apparatus to:

group linear constraints in the optimization model;

solve the optimization model with the removed nonlinear constraints to determine optimal values for variables categorized as connecting nodes in the supply chain or variables in an objective function;

pass the determined optimal values back to given individual equation-oriented models that contain the nonlinear constraints;

solve the given individual equation-oriented models, wherein:

if an individual equation-oriented model is feasible the solving converges; and if an individual equation-oriented model is infeasible, the solving does not converge and, in response, (i) creating a cut constraint in terms of variables categorized as at least one of: connecting nodes in the supply chain and in an objective function and (ii) adding the cut constraint to the optimization model; and iteratively solve the optimization model until solving each individual equation-oriented model converges.

\* \* \* \* \*